USOO7155067B2

(12) United States Patent
Jayant et al.

(10) Patent No.: US 7,155,067 B2
(45) Date of Patent: Dec. 26, 2006

(54) ADAPTIVE EDGE DETECTION AND ENHANCEMENT FOR IMAGE PROCESSING

(75) Inventors: Nuggehally S. Jayant, Alpharetta, GA (US); Seong H. Jang, Doraville, GA (US); Janghyun Yoon, Smyrna, GA (US)

(73) Assignee: EG Technology, Inc., Atlanta, GA (US)

( * ) Notice: Subject to any disclaimer, the term of this patent is extended or adjusted under 35 U.S.C. 154(b) by 716 days.

(21) Appl. No.: 09/903,028

(22) Filed: Jul. 11, 2001

(65) Prior Publication Data

US 2002/0006231 A1 Jan. 17, 2002

Related U.S. Application Data

(60) Provisional application No. 60/217,301, filed on Jul. 11, 2000.

(51) Int. Cl.
*G06K 9/40* (2006.01)
(52) U.S. Cl. ........................ 382/268; 382/199
(58) Field of Classification Search ........ 382/266–269, 382/199, 218, 224, 233, 263
See application file for complete search history.

(56) References Cited

U.S. PATENT DOCUMENTS

| 4,742,556 A | * | 5/1988 | Davis et al. ................. 382/172 |
| 5,023,919 A | | 6/1991 | Wataya ......................... 382/263 |
| 5,237,316 A | * | 8/1993 | Cox et al. ..................... 345/605 |
| 5,418,574 A | * | 5/1995 | Miyabata et al. ............. 348/625 |
| 5,844,614 A | * | 12/1998 | Chong et al. ............. 375/240.24 |
| 5,850,294 A | * | 12/1998 | Apostolopoulos et al. ...................... 358/426.14 |
| 5,883,971 A | * | 3/1999 | Bolle et al. .................. 382/124 |
| 5,909,249 A | * | 6/1999 | Sathe et al. ............. 375/240.18 |
| 6,229,578 B1 | * | 5/2001 | Acharya et al. ............. 348/607 |
| 6,246,783 B1 | * | 6/2001 | Avinash ....................... 382/128 |
| 6,259,822 B1 | * | 7/2001 | Hamilton et al. ............ 382/266 |
| 6,473,092 B1 | * | 10/2002 | Sojourner .................... 345/589 |
| 6,608,942 B1 | * | 8/2003 | Le ................................ 382/279 |

OTHER PUBLICATIONS

Scognamiglio et al., Picture Enhancement in Video and Block-Coded Image Sequences, Aug. 1999, IEEE Transactions on Consumer Electronics, vol. 45, pp. 680-689.*

(Continued)

*Primary Examiner*—Daniel Miriam
*Assistant Examiner*—Dennis Rosario
(74) *Attorney, Agent, or Firm*—Needle & Rosenberg, P.C.

(57) ABSTRACT

The present invention improves image quality by detecting and enhancing edges in an image. Images often include blurry or fuzzy edges that can obscure an image. An edge is a portion of an image separating two regions of substantially constant image intensity. An image can be examined on a pixel-by-pixel basis to find a candidate edge. When a candidate edge is found, a determination can made as to whether the candidate edge is a true edge. A true edge can be enhanced by amplifying the image intensity differences between pixels on the true edge and adjacent pixels not on the true edge. The present invention also provides a novel image processing filter for eliminating well-known noise from an image. The image processing filter can further improve edge enhancement by eliminating such noise prior to the edge detection and enhancement.

26 Claims, 19 Drawing Sheets

OTHER PUBLICATIONS

Vander Kam R A et al.; Edge Enhancement in Clustered-Dot Dithering; Proceedings of the International Conference on Image Processing (ICIP); Lausanne, Sep. 16-19, 1996, New York; IEEE, Us; pp. 857-860.

Law T et al.; Image Filtering; Edge Detection, and Edge Tracing Using Fuzzy Reasoning; vol. 18, May 1996; pp. 481-491.

Jia-Guu Leu; Image Contrast Enhancement Based on the Intensities of Edge Pixels CVGIP Graphical Models and Image Processing, Academic Press, Duluth, MA, vol. 54 pp. 497-506.

Trujillo A; Thin Edge Detector; Image Analysis and Processing, 1999 Proceedings; International Conference on Venice, Italy, Sep. 27-29, 1999, pp. 1051-1054.

Rosenfeld A et al.; Digital Picture Processing, Digital Picture Processing, Orlando, Academic Press, U.S., vol. 2, 1982, pp. 84-138.

* cited by examiner

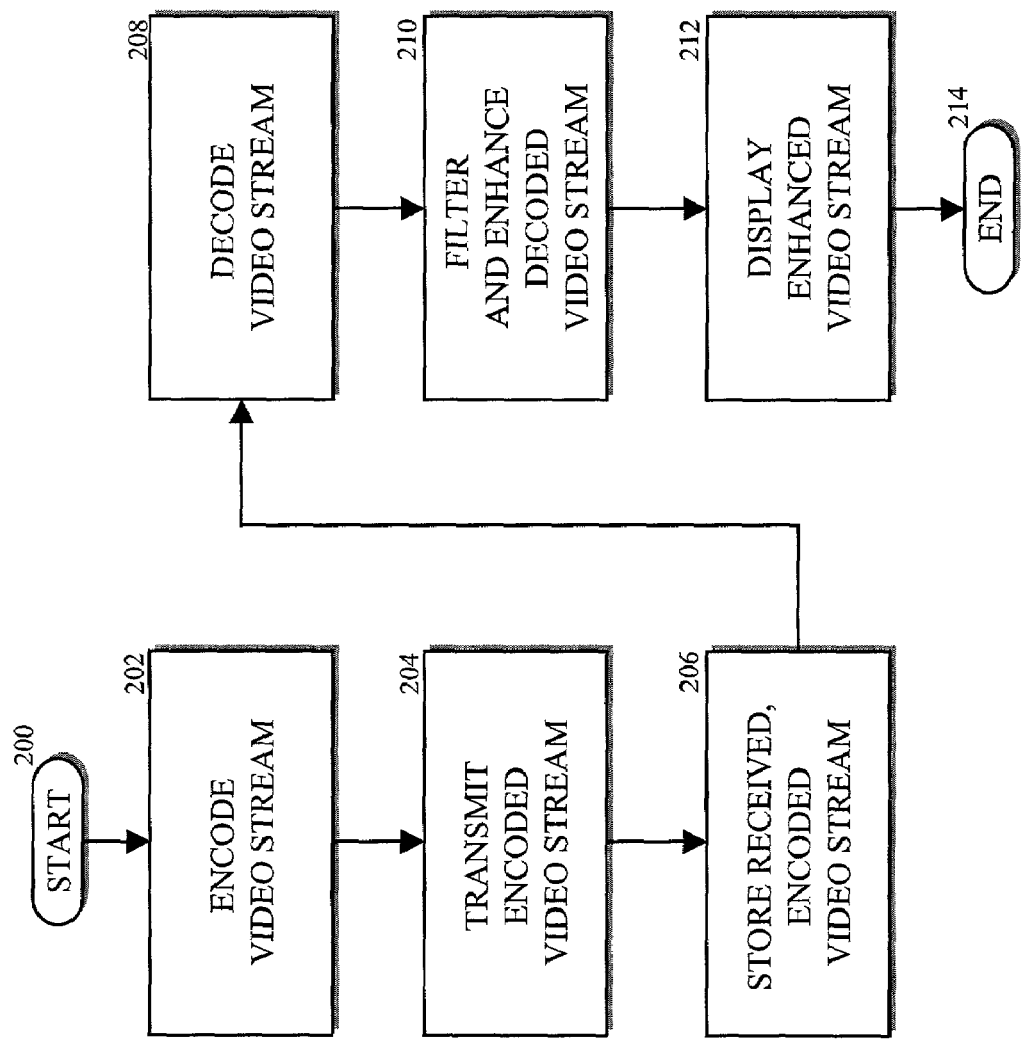

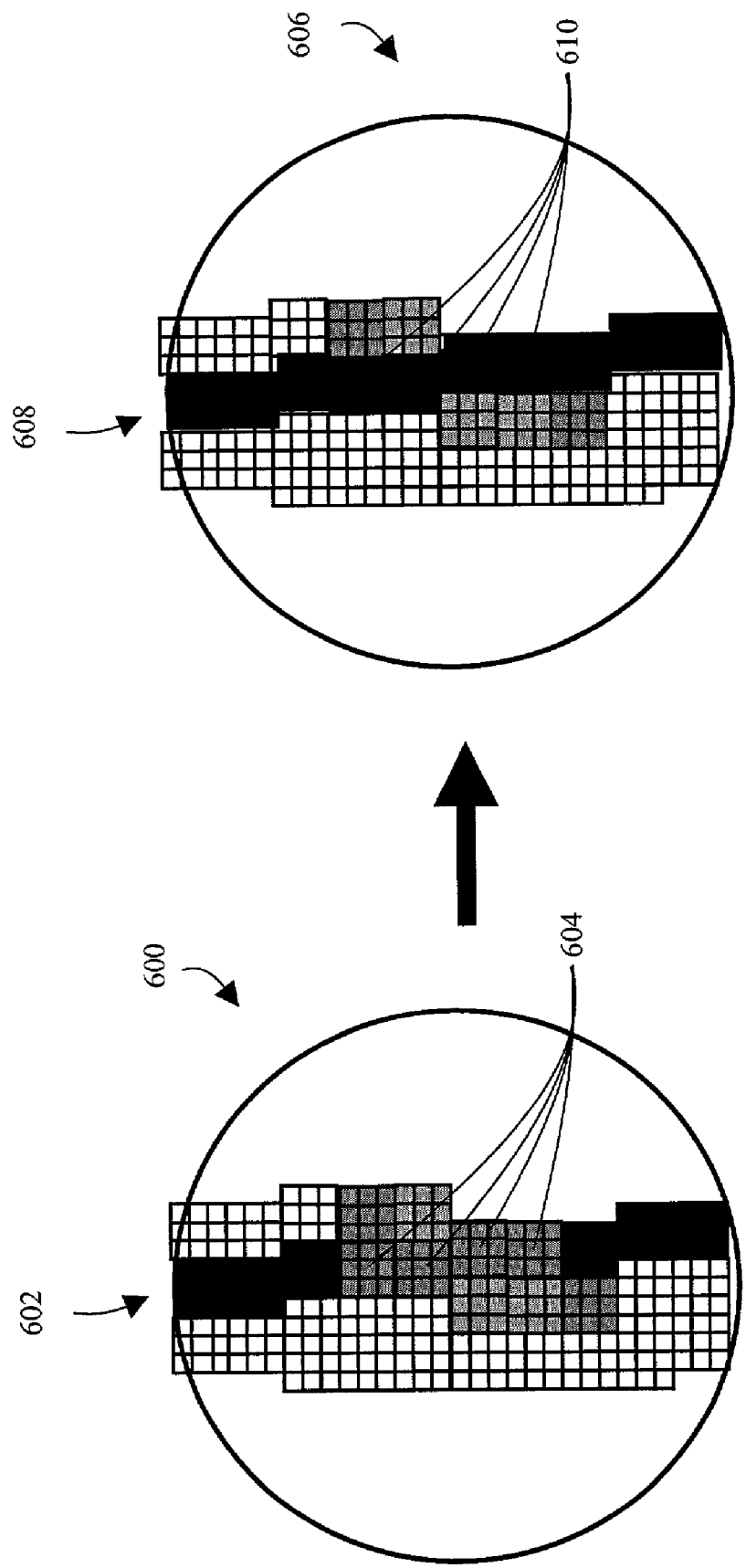

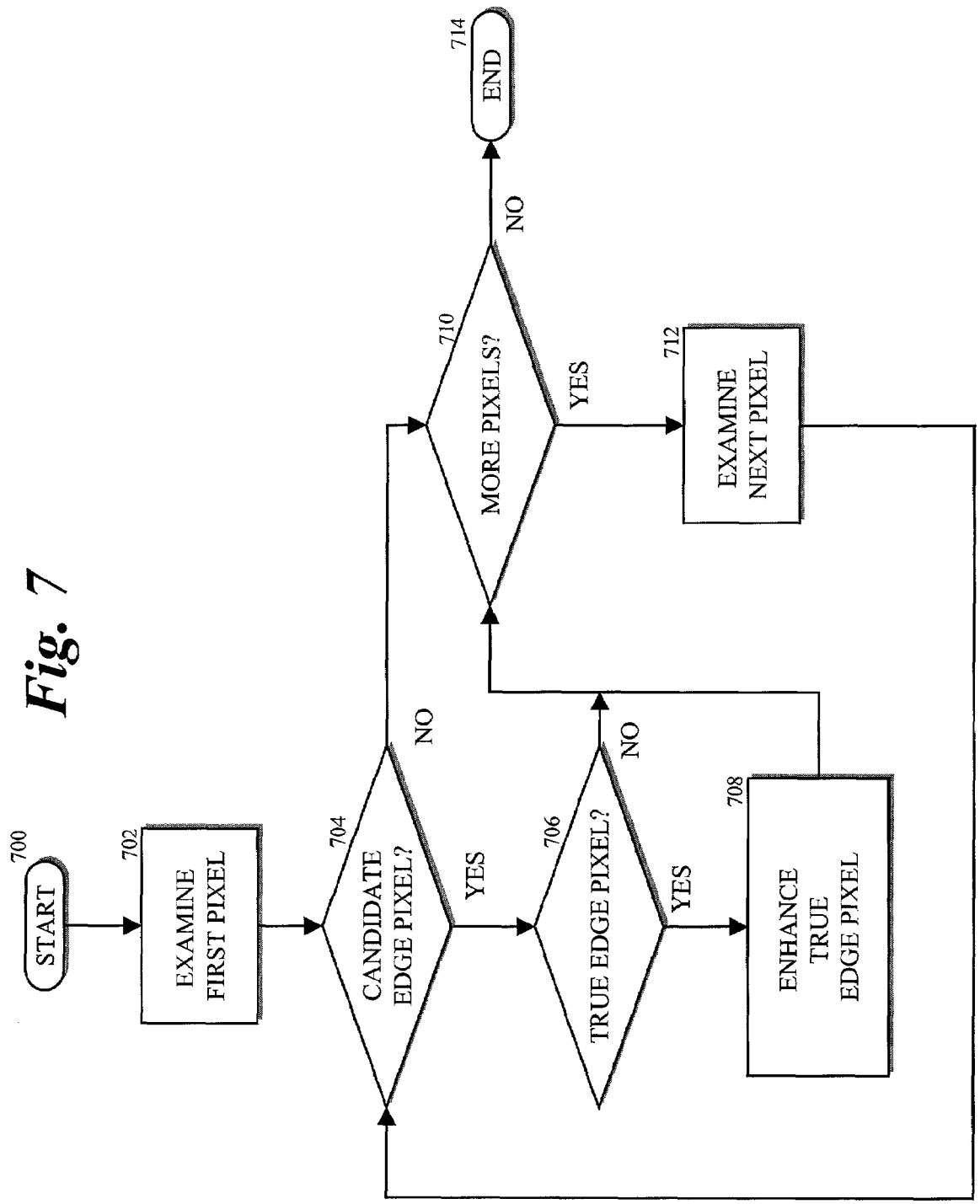

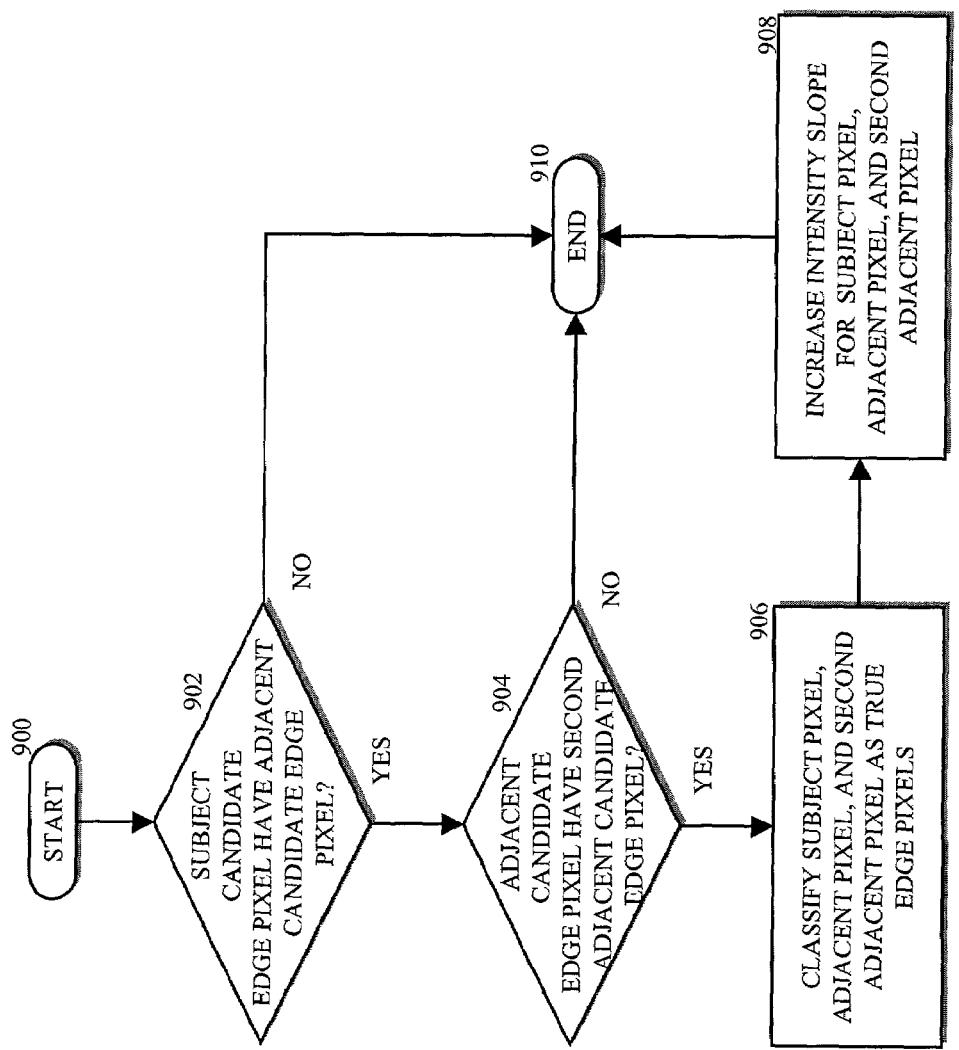

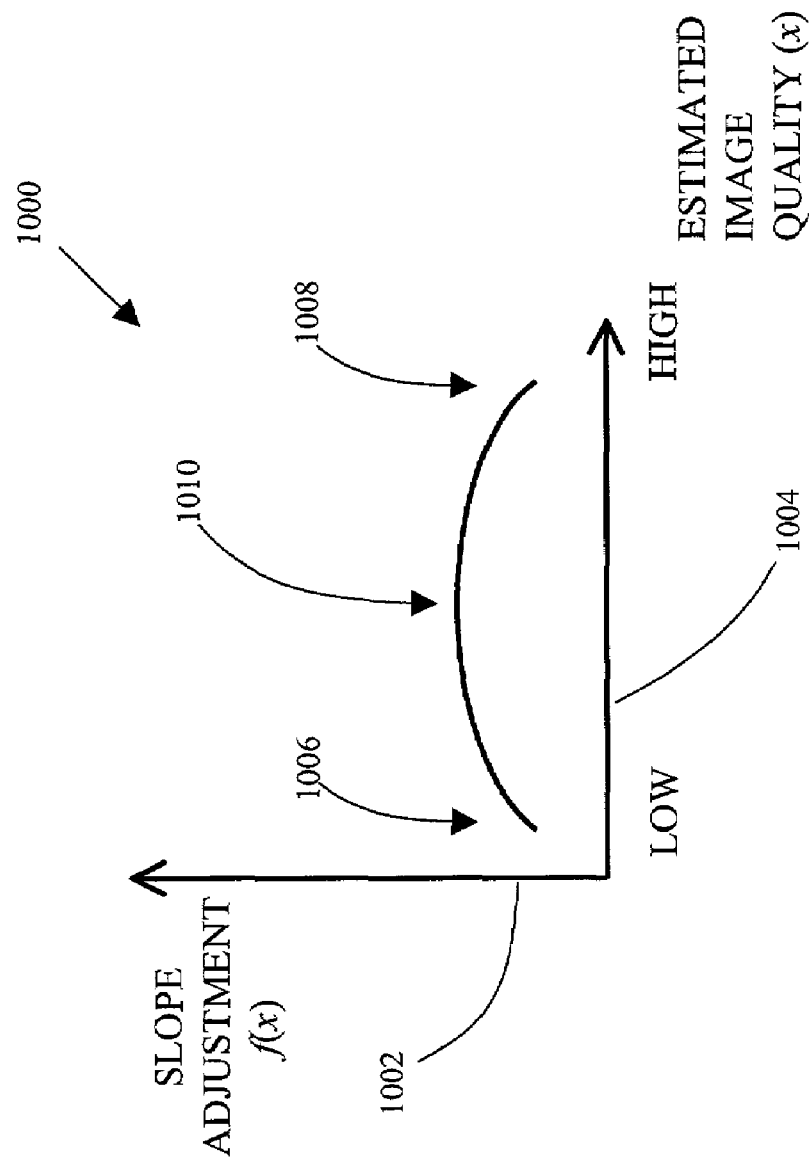

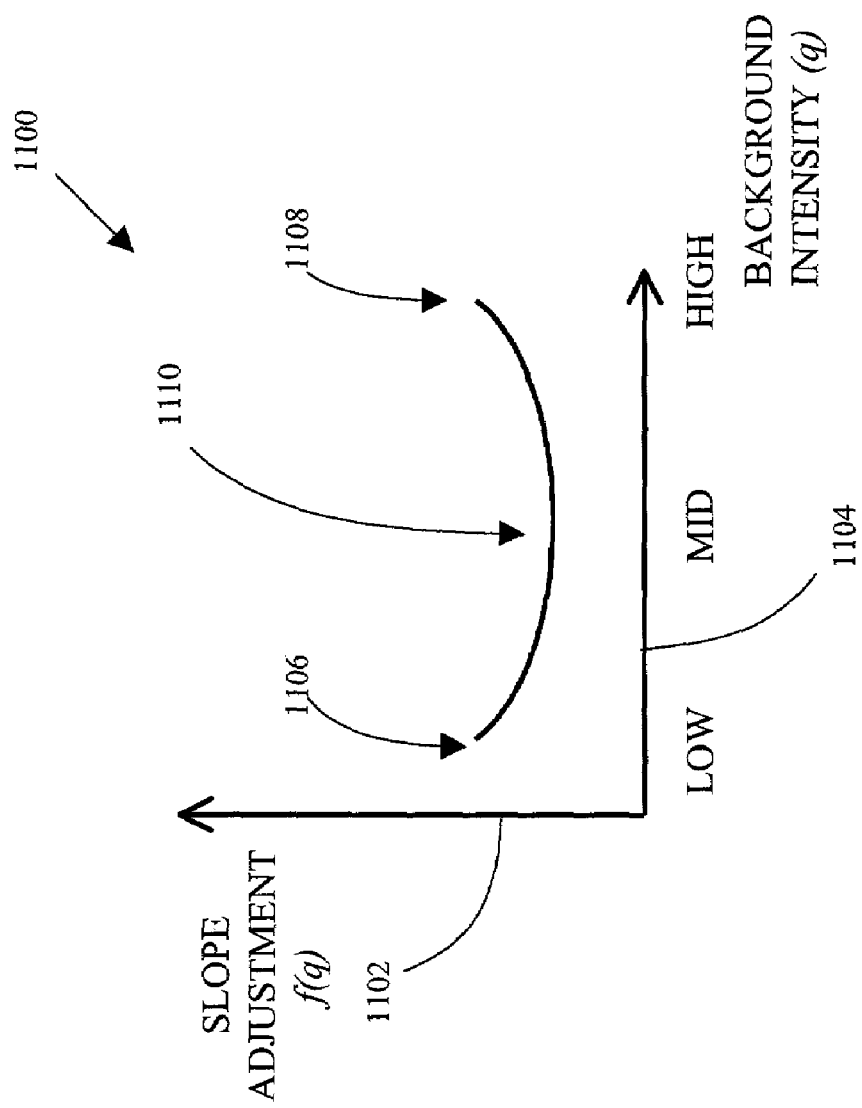

Fig. 14a

| $x_3$ | $x_5$ | $x_8$ |
|---|---|---|
| $x_2$ | $x_0$ | $x_7$ |
| $x_1$ | $x_4$ | $x_6$ |

1400

ADAPTIVE EDGE DETECTION AND ENHANCEMENT FOR IMAGE PROCESSING

PRIORITY AND RELATED APPLICATIONS

The present application claims priority to provisional patent application entitled, "Video Processing Method with General and Specific Applications," filed on Jul. 11, 2000 and assigned U.S. application Ser. No. 60/217,301. The present application is also related to non-provisional application entitled, "System and Method for Calculating an Optimum Display Size for a Visual Object," filed on Jul. 11, 2001 and assigned U.S. application No. 09/902,995 and non-provisional application entitled, "Video Compression Using Adaptive Selection of Groups of Frames, Adaptive Bit Allocation, and Adaptive Replenishment," filed on Jul. 11, 2001 and assigned U.S. application Ser. No. 09/902,976.

FIELD OF THE INVENTION

The present invention relates to the processing of images and more specifically relates to the improvement of images by detecting an edge dividing areas of substantially constant image intensity and enhancing the edge by amplifying the intensity difference between the detected edge and the adjacent areas.

BACKGROUND OF THE INVENTION

Recent advancements in communication technologies have enabled the widespread distribution of data over communication mediums such as the Internet and broadband cable systems. This increased capability has lead to increased demand for the distribution of a diverse range of content over these communication mediums. Whereas early uses of the Internet were often limited to the distribution of raw data, more recent advances include the distribution of HTML-based graphics and audio files.

More recent efforts have been made to distribute video media over these communication mediums. However, because of the large amount of data needed to represent a video presentation, the data is typically compressed prior to distribution. Data compression is a well-known means for conserving transmission resources when transmitting large amounts of data or conserving storage resources when storing large amounts of data. In short, data compression involves minimizing or reducing the size of a data signal (e.g., a data file) in order to yield a more compact digital representation of that data signal. Because digital representations of audio and video data signals tend to be very large, data compression is virtually a necessary step in the process of widespread distribution of digital representations of audio and video signals.

Fortunately, video signals are typically well suited for standard data compression techniques. Most video signals include significant data redundancy. Within a single video frame (image), there typically exists significant correlation among adjacent portions of the frame, referred to as spatial correlation. Similarly, adjacent video frames tend to include significant correlation between corresponding image portions, referred to as temporal correlation. Moreover, there is typically a considerable amount of data in an uncompressed video signal that is irrelevant. That is, the presence or absence of that data will not perceivably affect the quality of the output video signal. Because video signals often include large amounts of such redundant and irrelevant data, video signals are typically compressed prior to transmission and then expanded (i.e., decompressed) again after transmission.

Generally, the distribution of a video signal includes a transmission unit and a receiving unit. The transmission unit will receive a video signal as input and will compress the video signal and transmit the signal to the receiving unit. Compression of a video signal is usually performed by an encoder. The encoder typically reduces the data rate of the input video signal to a level that is predetermined by the capacity of the transmission or storage medium. For example, for a typical video file transfer, the required data rate can be reduced from about 30 Megabits per second to about 384 kilobits per second. The compression ratio is defined as the ratio between the size of the input video signal and the size of the compressed video signal. If the transmission medium is capable of a high transmission rate, then a lower compression ratio can be used. On the other hand, if the transmission medium is capable of a relatively low transmission rate, then a higher compression ratio can be used.

After the receiving unit receives the compressed video signal, the signal must be decompressed before it can be adequately displayed. The decompression process is performed by a decoder. In some applications, the decoder is used to decompress the compressed video signal so that it is identical to the original input video signal. This is referred to as lossless compression, because no data is lost in the compression and expansion processes. The majority of encoding and decoding applications, however, use lossy compression, wherein some predefined amount of the original data is irretrievably lost in the compression and expansion process. In order to expand the video stream to its original (pre-encoding) data size, the lost data must be replaced by new data. Unfortunately, lossy compression of video signals will almost always result in the degradation of the output video signal when displayed after decoding, because the new data is usually not identical to the lost original data. Video signal degradation typically manifests itself as a perceivable flaw in a displayed video image. These flaws are typically referred to as noise. Well-known kinds of video noise include blockiness, mosquito noise, salt-and-pepper noise, and fuzzy edges. The data rate (or bit rate) often determines the quality of the decoded video stream. A video stream that was encoded with a high bit rate is generally a higher quality video stream than one encoded at a lower bit rate.

Therefore, there is a need in the art for image enhancement that offsets some of the well-known image flaws caused by the conventional encoding and decoding processes. The image enhancement should be adaptive to provide varying degrees of enhancement, based on various constraints, such as transmission bit rate and image brightness.

SUMMARY OF THE INVENTION

The present invention improves image quality by detecting and enhancing edges in an image. An edge is a portion of an image separating two regions of substantially constant image intensity. An image can be examined on a pixel-by-pixel basis to find a candidate edge pixel. Candidate edge pixels are pixels that have an image intensity that differs from the intensity of adjacent pixels by more than a predefined threshold amount. When a candidate edge pixel is found, a determination can made as to whether the candidate edge pixel resides on a true edge. A candidate edge pixel resides on a true edge when one or more other candidate edge pixels are adjacent and/or contiguous with the initial candidate edge pixel. A true edge can be enhanced by amplifying the image intensity differences between the pixels on the true edge and those adjacent pixels not on the true edge. The present invention also provides a novel image processing filter for eliminating well known noise from an image. The image processing filter can further improve edge enhancement by eliminating such noise prior to the edge detection and enhancement.

In one aspect of the present invention, a method is provided for processing an image. A first image intensity associated with a subject image portion is compared with a second image intensity associated with an adjacent image portion. An image intensity difference between the first image intensity and the second image intensity is determined. The subject image portion is classified as a candidate edge portion in response to a determination that the first image intensity is less than the second image intensity and a determination that the image intensity difference is greater than a predetermined threshold image intensity difference. A determination is made as to whether the candidate edge portion is a true edge portion. The subject image portion is associated with a third image intensity, wherein the third image intensity is less than the first image intensity.

In another aspect of the present invention, a system for enhancing a digitized image is provided. The system includes a decoder operative to receive an encoded digitized image and to expand the encoded digitized image to generate a decoded digitized image. The system also includes a post-processing unit operative to filter the decoded digitized image to process image flaws. The system also includes an edge enhancer operative to detect an edge in the decoded digitized image and to enhance the edge in the decoded digitized image.

In yet another aspect of the invention, a method is provided for detecting and enhancing an edge in a decoded digitized image. A first image intensity is determined, where the first image intensity is associated with a first pixel in the decoded digitized image. A second image intensity associated with a second pixel in the decoded digitized image is also determined. A third image intensity associated with a third pixel in the decoded digitized image is also determined. The first pixel is classified as a first candidate edge pixel in response to a determination that the first image intensity is less than the second image intensity and is less than the third image intensity. A determination is made as to whether the first pixel is adjacent to a second candidate edge pixel. Another determination is made as to whether the second pixel is adjacent to a third candidate edge pixel. The first pixel is classified as a true edge pixel in response to a determination that the first pixel is adjacent to the second candidate edge pixel and the second candidate edge pixel is adjacent to the third candidate edge pixel. A fourth image intensity is associated with the first pixel, where the fourth image intensity is lower than the first image intensity.

BRIEF DESCRIPTION OF THE DRAWINGS

FIG. 1b depicts an enlarged view of the fuzzy edge of the image of FIG. 1a.

FIG. 2 is a flowchart depicting an exemplary method for coding, transmitting, and decoding a video stream.

FIG. 6a depicts an exemplary pixel matrix in enhanced and in unenhanced images.

FIG. 7 is a flow chart depicting an exemplary method for examining and enhancing the pixels of a digitized image.

FIG. 9 is a flow chart depicting an exemplary method for detecting and enhancing true edge pixels.

FIG. 10 is a graph depicting an embodiment of the present invention in which the intensity slope adjustment is adapted to match the image quality of an unenhanced image.

FIG. 11 is a graph depicting an adaptive slope adjustment utilized in another alternative embodiment of the present invention.

FIG. 14a is a block diagram depicting an exemplary group of adjacent pixels that may be examined and filtered for mosquito noise by an exemplary embodiment of the present invention.

DETAILED DESCRIPTION

Figure 1A:
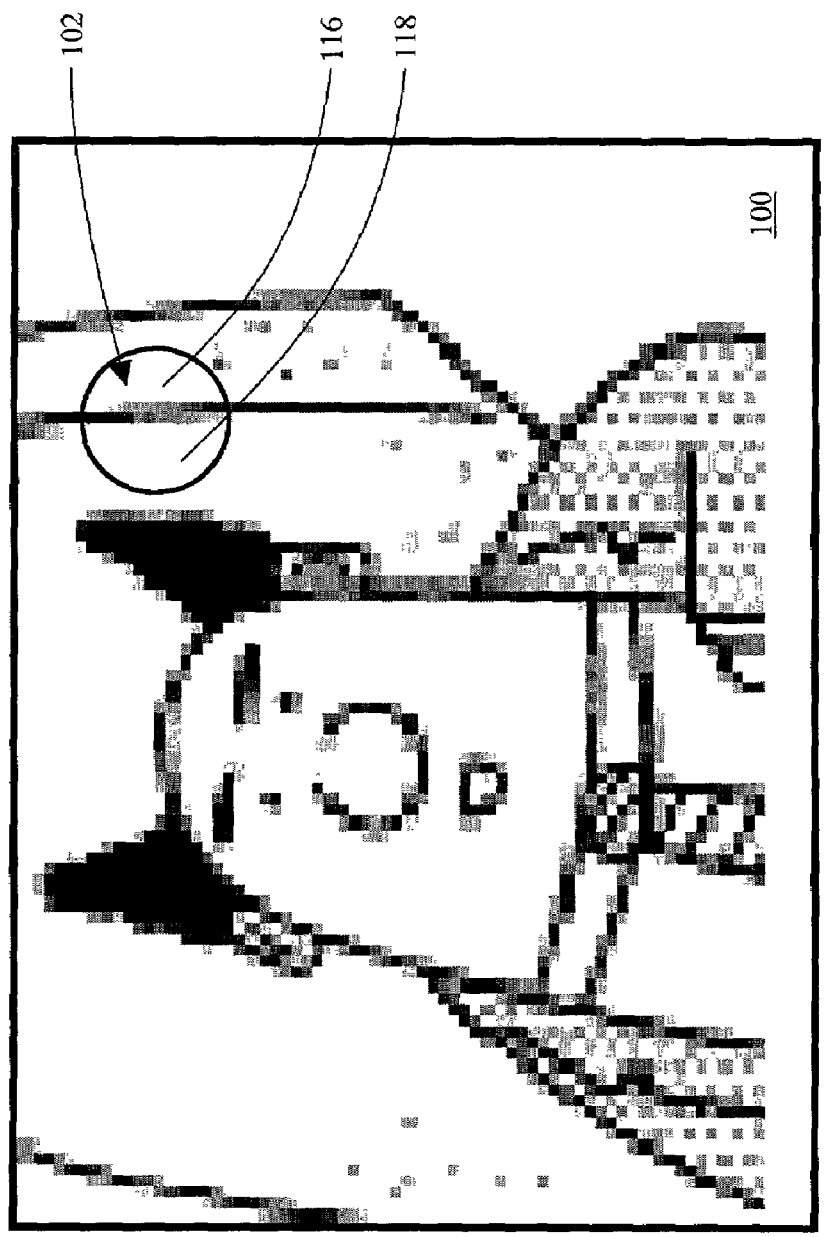
FIG. 1a depicts an exemplary image that has been compressed and decompressed and includes a fuzzy edge.
Figure 1B:
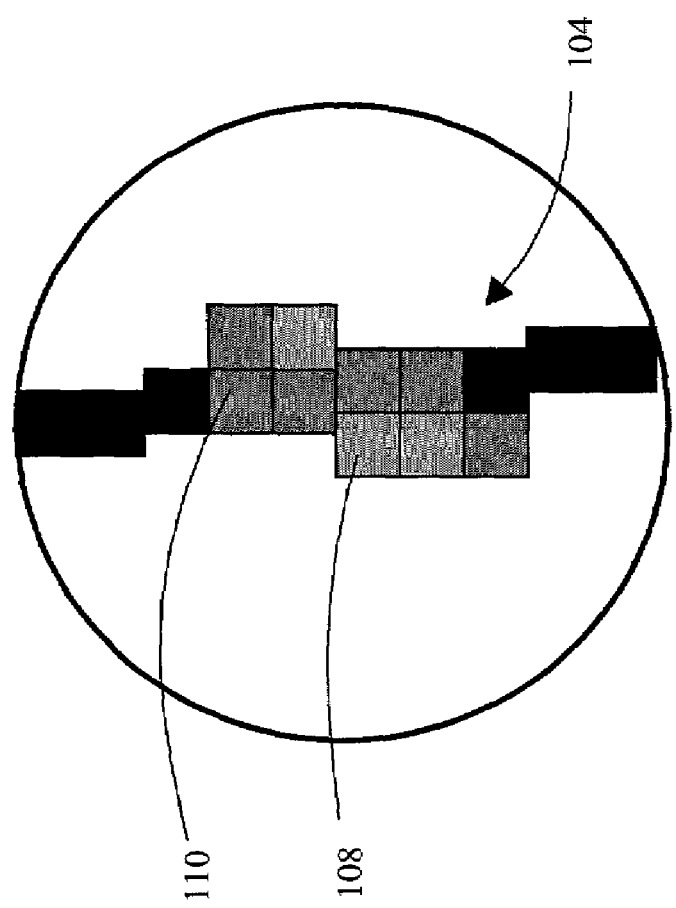

FIG. 1a depicts an exemplary image that has been compressed and decompressed and includes a fuzzy edge. The image 100 has been compressed and decoded, such that it has various perceivable flaws. For example, a line 102 that should be a solid black line, includes lighter colored pixels. These lighter colored pixels have been created during the compression and decoding processes as a result of an attempt to represent a diagonal line within the constraints of a pixel matrix. The line 102 is an edge dividing two areas of substantially uniform image intensity 116, 118. FIG. 1b depicts an enlarged line 104 that is simply a magnified depiction of the line 102. The magnified line 104 exaggerates the perceivable flaws of line 102. For example, pixel 110 should be black (i.e., low image intensity), rather than gray (i.e., relatively higher image intensity). Similarly, pixel 108 should be white (i.e., high image intensity), rather than gray (i.e., relatively lower image intensity). As a result of these perceivable flaws, among others, line 102 is not a solid black line, but is, instead, a broken black line including gray pixels.

Figure 1C:
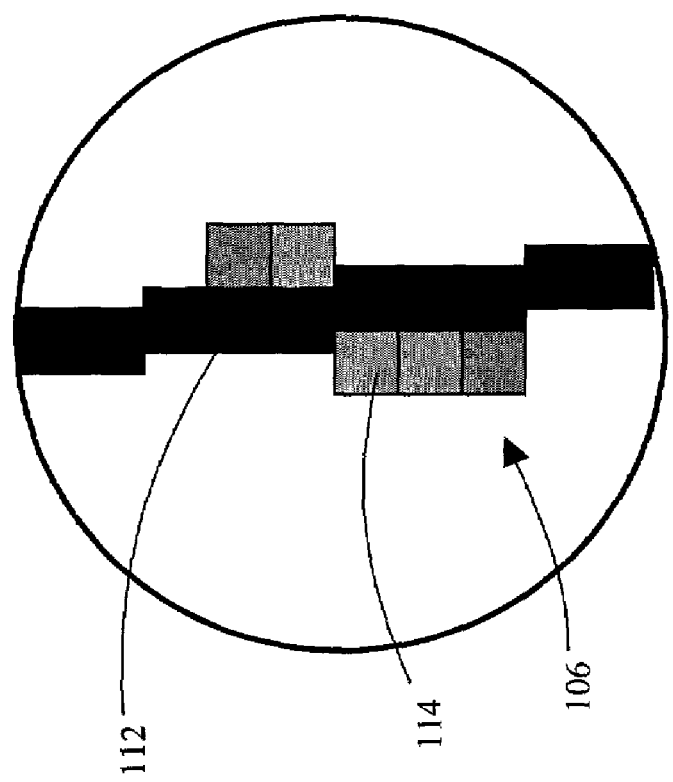
FIG. 1c depicts an enlarged view of the image of FIG. 1a after the fuzzy edge has been processed by an exemplary embodiment of the present invention.

An embodiment of the present invention processes the image 100 to enhance image edges, such as that represented by line 102. FIG. 1c depicts an enlarged line 106 that is simply a magnified depiction of the line 102 after the line has been enhanced by an exemplary embodiment of the present invention. That is, magnified line 104 can be processed to generate enhanced line 106. While the gray pixel 108 has been substantially unchanged to generate gray pixel 114, gray pixel 110 has been modified to generate black pixel 112. Thus, the enhanced line 106 has a solid, black representation in an enhanced representation of the image 100. In an alternative embodiment of the present invention, gray pixel 114 (and others like it) could be changed to a white pixel to further enhance the edge represented by the enhanced line 106.

In an exemplary embodiment of the present invention, the image 100 is examined on a pixel-by-pixel basis. Edges are detected by comparing a subject pixel with its adjacent pixels. In the event that a subject pixel has an image intensity (e.g., luminance, chrominance) that is significantly different than that of an adjacent pixel, the subject pixel is identified as a potential edge pixel or a candidate edge pixel. An exemplary embodiment of the present invention may determine that a true edge exists where three or more candidate edge pixels form a contiguous unit. When a true edge has been identified, the edge can be enhanced by decreasing and/or increasing the image intensity of one or more pixels on or near the true edge.

FIG. 2 is a flowchart depicting an exemplary method for coding, transmitting, and decoding a video stream. One application for which the described exemplary embodiment of the present invention is particularly suited is that of video stream processing. A video stream is simply a series of related images that have been connected in a series to create the perception that objects in the image series are moving. Because of the large number of separate images that are required to produce a video stream, it is common that the series of images will be digitized and compressed, so that the entire video stream requires less space for transmission or storage. The process of compressing such a digitized video stream is often referred to as "encoding." Among other things, encoding a video stream typically involves removing the irrelevant and/or redundant digital data from the digitized video stream. Once the video stream has been so compressed, the video stream must usually be expanded before it can be properly displayed. The flow chart of FIG. 2 depicts the steps that are generally followed to encode, decode, and display a video stream.

The method of FIG. 2 begins at start block 200 and proceeds to step 202. At step 202, the input video stream is encoded. As described, the encoding process involves, among other things, the compression of the digitized data making up the input video stream. The method proceeds from step 202 to step 204. At step 204, the encoded video stream is transmitted. Often this transmission can be made over conventional broadcast infrastructure, but could also be over broadband communication resources and/or internet-based communication resources.

The method proceeds from step 204 to step 206. At step 206, the received, encoded video stream is stored. As described above, the compressed video stream is significantly smaller than the input video stream. Accordingly, the storage of the received, encoded video stream requires fewer memory resources than storage of the input video stream would require. This storage step may be performed by a computer receiving the coded video stream over the Internet. Those skilled in the art will appreciate that step 206 could be performed by a variety of well-known means and could even be eliminated from the method depicted in FIG. 2. For example, in a real-time streaming video application, the video stream is typically not stored prior to display.

The method proceeds from step 206 to step 208. At step 208 the video stream is decoded. Decoding a video stream includes, among other things, expanding the encoded video stream to its original data size. That is, the encoded video stream is expanded (i.e., decompressed) so that it is the same size as the original input video stream. The irrelevant and/or redundant video data that was removed in the encoding process is replaced with new data. Various, well-known algorithms are available for decoding an encoded video stream. Unfortunately, these algorithms are typically unable to return the encoded video stream to its original form without some perceivable image degradation. Consequently, a decoded video stream is typically filtered by a post-processing filter to reduce flaws (e.g., noise) in the decoded video stream.

Accordingly, the method of FIG. 2 proceeds from step 208 to step 210, wherein the video stream is filtered and enhanced. This step may be performed using a conventional post-processing filter to reduce noise such as mosquito noise, salt-and-pepper noise, and blockiness. Any edges found in the images of the decoded video stream also may be enhanced according to an exemplary embodiment of the present invention. Once the video stream has been decoded, filtered, and enhanced, it is suitable for displaying. The method of FIG. 2 proceeds from step 210 to step 212 and the enhanced video stream is displayed. The method then proceeds to end block 214 and terminates.

Figure 3:
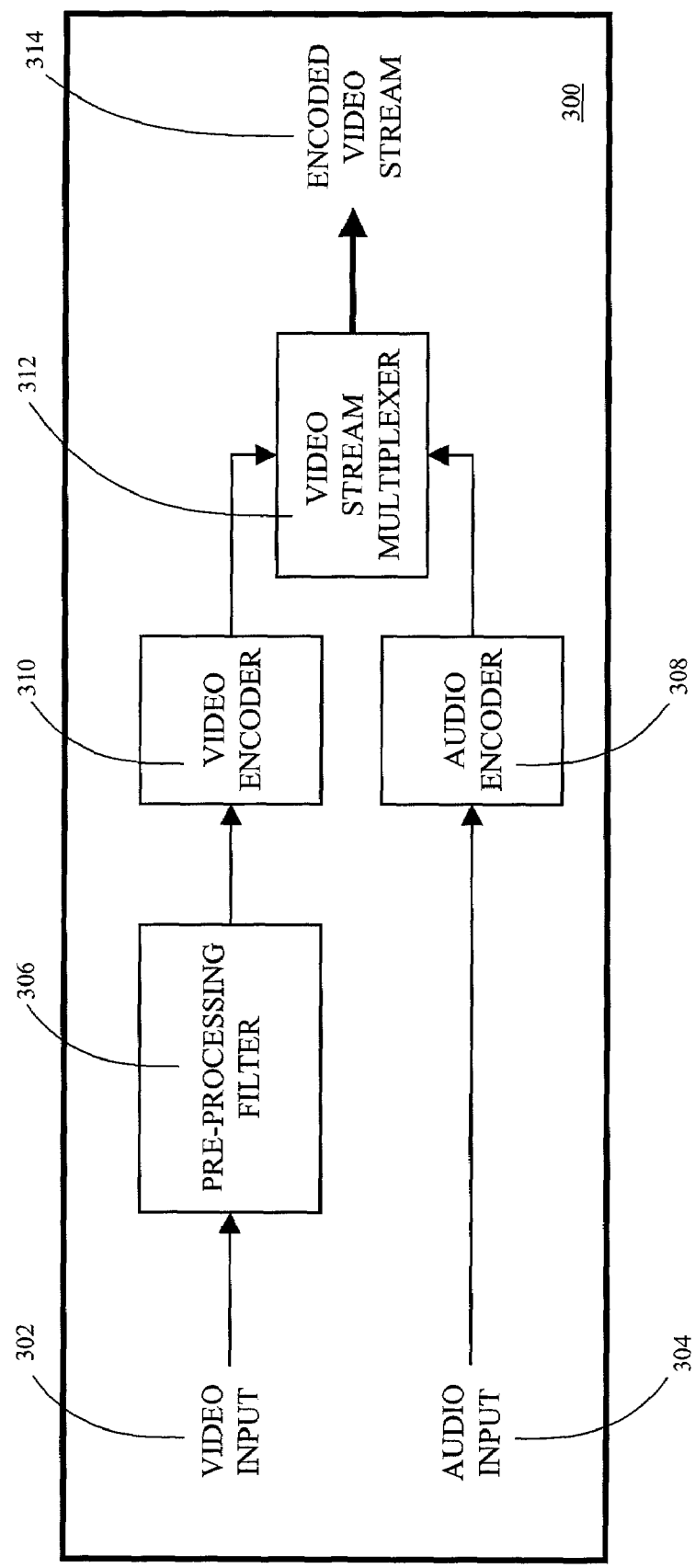
FIG. 3 is a block diagram depicting a conventional system for encoding a video stream.

FIG. 3 is a block diagram depicting a conventional system for encoding a video stream. The encoding system 300 receives a video input 302 and an audio input 304. The video input is typically a collection of digitized images that are linked together in series. The audio input 304 is simply the audio signal that is associated with the series of images making up the video input 302.

The video input 302 is first passed through a pre-processing filter 306 that, among other things, filters noise from the video input 302 to prepare the input video stream for encoding. Unfortunately, conventional pre-processing filters will often blur (soften) edges in the images of the video stream as an unintended result of noise filtration. Edge blurring is a well-known characteristic of pre-processing filters. The pre-processed video stream is then passed to the video encoder 310. The video encoder compresses the video signal by eliminating irrelevant and/or redundant data from the input video signal. The video encoder 310 may reduce the input video signal to a predetermined size to match the transmission requirements of the encoding system 300. Alternatively, the video encoder 310 may simply be configured to minimize the size of the encoded video signal. This method might be used, for example, to maximize the storage capacity of a storage medium (e.g., hard drive).

In a similar fashion, the audio input 304 is compressed by the audio encoder 308. In some conventional encoding systems, the audio signal also may be subjected to a pre-processing filter (not shown). The encoded audio signal is then passed with the encoded video signal to the video stream multiplexer 312. The video stream multiplexer 312 combines the encoded audio signal and the encoded video signal so that the signals can be subsequently separated and played-back substantially simultaneously. After the encoded video and encoded audio signals have been combined, the encoding system outputs the combined signal as an encoded video stream 314. The encoded video stream 314 is thus prepared for transmission, storage, or other processing as needed by a particular application. Often, the encoded video stream 314 will be transmitted to a decoding system that will decode the encoding video stream 314 and prepare it for subsequent display.

Figure 4:
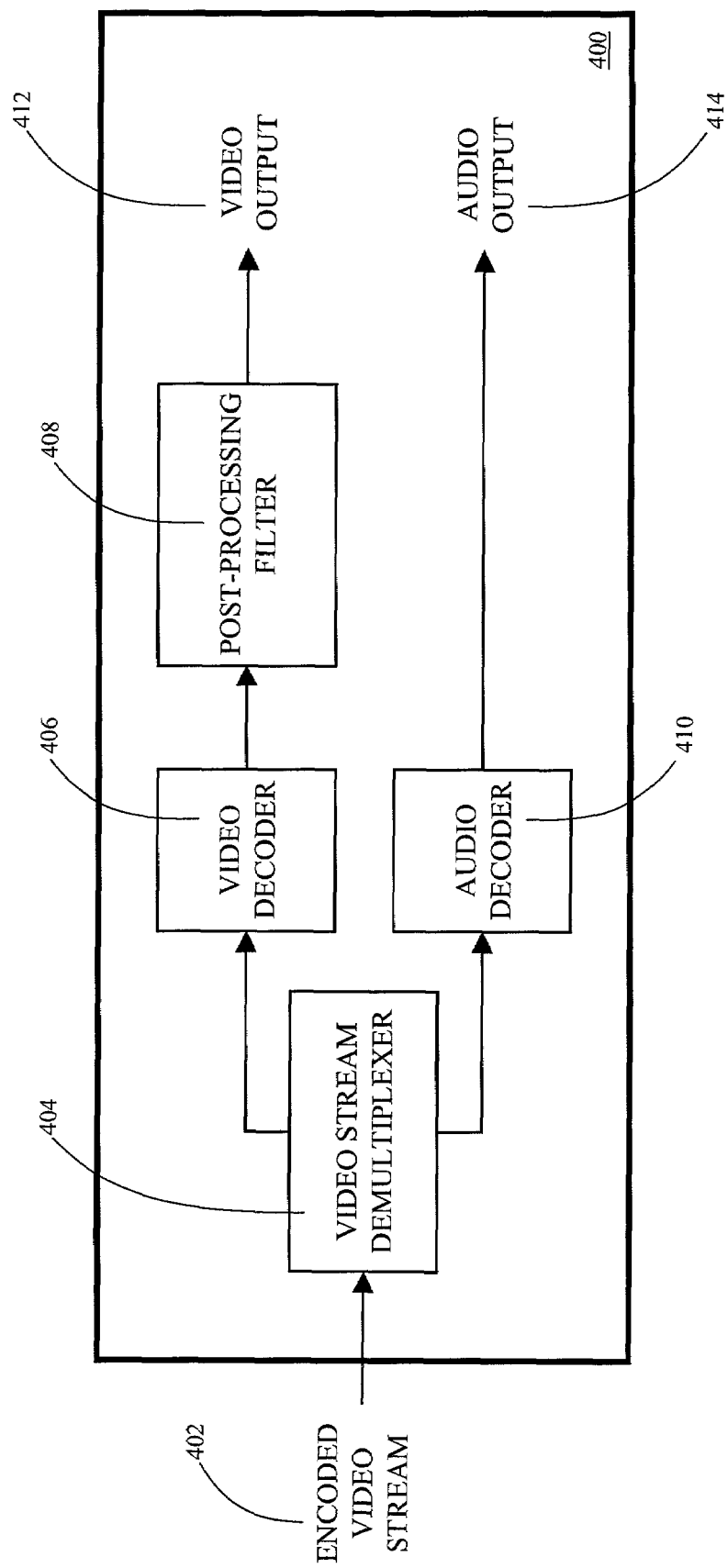
FIG. 4 depicts a conventional decoding system for receiving an encoded video stream and providing decoded video and audio output.

FIG. 4 depicts a conventional decoding system for receiving an encoded video stream and providing decoded video and audio output. The decoding system 400 receives an encoded video stream 402 as input to a video stream demultiplexer 404. The video stream demultiplexer separates the encoded video signal and the encoded audio signal from the encoded video stream 402. The encoded video signal is passed from the video stream demultiplexer 404 to the video decoder 406. Similarly, the encoded audio signal is passed from the video stream demultiplexer 404 to the audio decoder 410. The video decoder 406 and the audio decoder 410 expand the video signal and the audio signal to a size that is substantially identical to the size of the video input and audio input described above in connection with FIG. 3. Those skilled in the art will appreciate that various well-known algorithms and processes exist for decoding an encoded video and/or audio signal. It will also be appreciated that most encoding and decoding processes are lossy, in that some of the data in the original input signal is lost. Accordingly, the video decoder 406 will reconstruct the video signal with some signal degradation is often receivable as flaws in the output image.

The post-processing filter 408 is used to counteract some of the well-known noise found in a decoded video signal that has been encoded and/or decoded using a lossy process. Examples of such well-known noise types include mosquito noise, salt-and-pepper noise, and blockiness. The conventional post-processing filter 408 includes well-known algorithms to detect and counteract these and other known noise problems. The post-processing filter 408 generates a filtered, decoded video output 412. Similarly, the audio decoder 410 generates a decoded audio output 414. The video output 412 and the audio output 414 may be fed to appropriate ports on a display device, such as a television, or may be provided to some other display means such as a software-based media playback component on a computer or a static display device such as a printer. Alternatively, the video output 412 and the audio output 414 may be stored for subsequent display.

Figure 5:
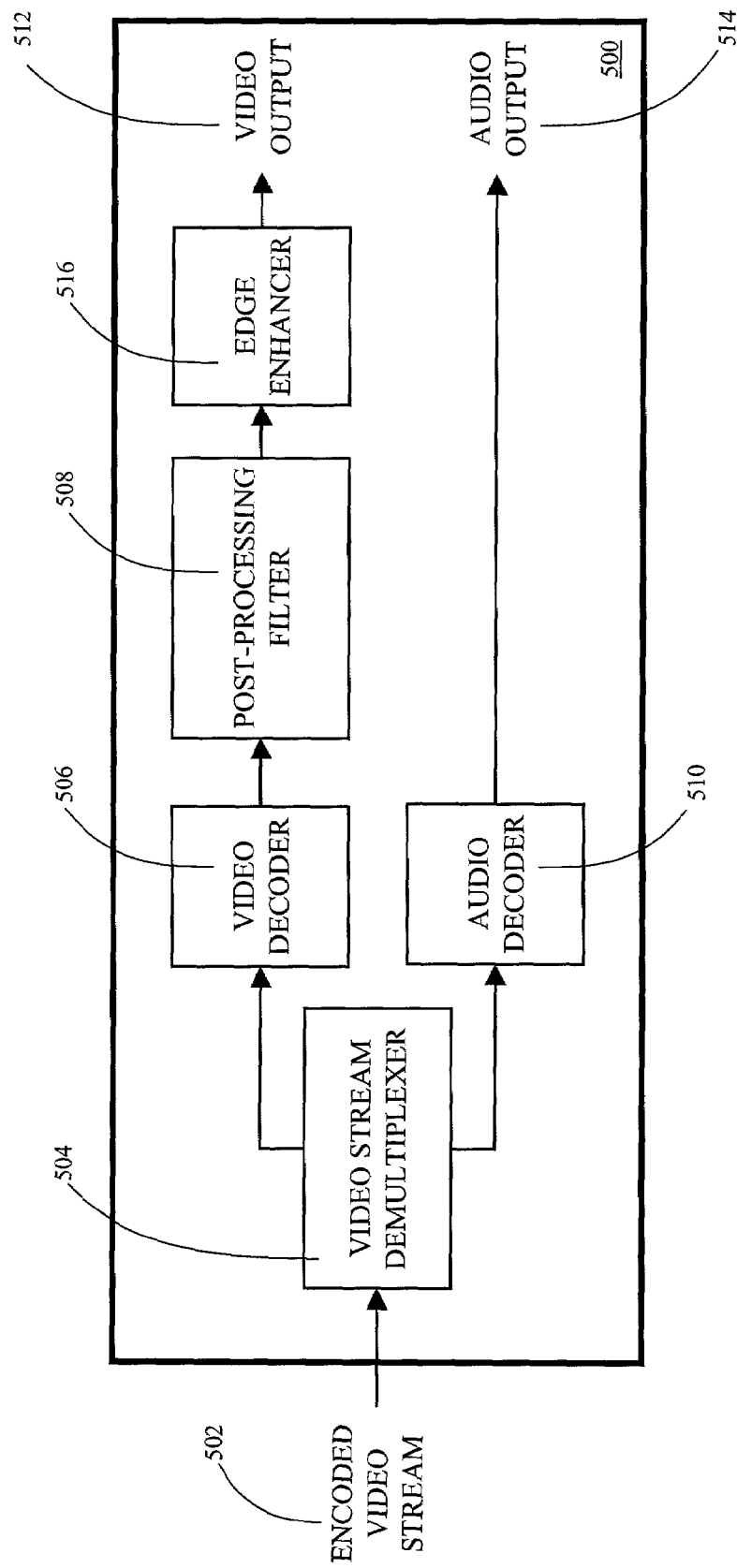
FIG. 5 is a decoding system that is an exemplary embodiment of the present invention.

FIG. 5 is a decoding system that is an exemplary embodiment of the present invention. The exemplary decoding system 500 includes many of the components found in the conventional decoding system 400 (FIG. 4) and also accepts an encoded video stream 502 as input. As with the system of FIG. 4, the encoded video stream 502 is sent through a video stream demultiplexer 504 and separated for decoding by a video decoder 506 and an audio decoder 510.

However, the exemplary decoding system 500 includes a specialized post-processing filter 508. The specialized post-processing filter 508 includes enhanced algorithms for counteracting the effects of mosquito noise, salt-and-pepper noise, and blockiness. These specialized algorithms enable the post-processing filter 508 to adapt the level of noise reduction to match the characteristics of the decoded video signal. This aspect of the post-processing filter 508 will be described in more detail in connection with FIGS. 12–14.

The decoded video signal passes from the post-processing filter 508 to the edge enhancer 516. The edge enhancer 516 detects and enhances edges found in images in the decoded video signal. As described above, it is quite common that the encoding and decoding processes will degrade an edge in at least one image. An edge is defined as a portion of an image separating two image portions of substantially identical intensity. For example, an image of the United States flag may include a substantially red portion next to a substantially white portion. However, the edge between the red portion and the white portion may be fuzzy or unclear. Animated images are especially susceptible to this type of edge degradation, because the characteristics of animation video include sharp edges in the spatial image as well as sharp temporal transitions in a video sequence. The edge enhancer 516 is designed to detect a suspected edge (i.e., a candidate edge), determine whether the candidate edge is a true edge, and enhance the edge to create a sharper edge. Enhancing the edge can include modifying the intensity (e.g., luminance, chrominance) of one or more pixels on or near the edge to make the edge more perceivable.

The filtered, enhanced, and decoded video stream is output from the edge enhancer 516 as video output 512. Likewise the audio decoder 510 produces the audio output 514. While the decoding system 500 of a exemplary embodiment of the present invention can be implemented with or without a post-processing filter, performance evaluations indicate that the specialized post-processing filter 508 improves the output of the edge enhancer 516. Accordingly, an exemplary embodiment of the present invention incorporates the functionality of the specialized post-processing filter with that of the edge enhancer to maximize the quality of the video output 512.

FIG. 6a depicts an exemplary pixel matrix in enhanced and in unenhanced images. A pixel matrix 600 of an unenhanced image includes flaws that result in a fuzzy edge 602. The edge 602 is fuzzy, because pixels 604 that should be black (i.e., low image intensity) are, instead, represented as gray pixels (i.e., higher image intensity). Once enhanced, however, the enhanced pixel matrix 606 includes a distinctive edge 608. Notably, the gray pixel 604 in the unenhanced pixel matrix 600 is associated with a low image intensity (i.e., black) as shown by pixels 610 in enhanced pixel matrix 606.

Figure 6B:
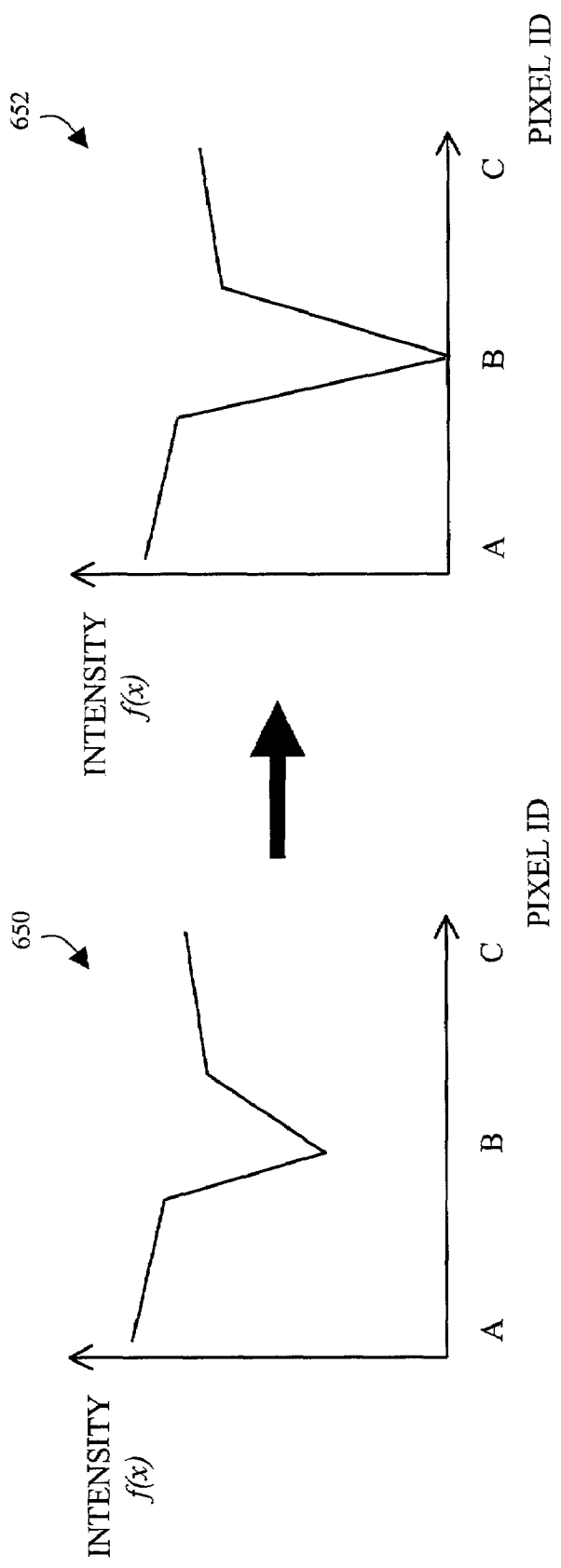
FIG. 6b depicts an exemplary pixel intensity graph illustrating the relationship between adjacent pixels in enhanced and in unenhanced images.

An edge in the unenhanced pixel matrix 600 can be detected by comparing adjacent pixels. FIG. 6b depicts an exemplary pixel intensity graph illustrating the relationship between adjacent pixels in enhanced and in unenhanced images. The intensity graph 650 depicts the intensity relationship between an edged pixel B and its adjacent pixels A and C. The intensity level is shown on the y-axis of the graph 650 and the pixel identification is shown on the x-axis of the graph. The intensity of pixel A is higher than the intensity of pixel B. Likewise, the intensity of pixel C is higher than the intensity of pixel B. Accordingly, B can be identified as a candidate edge pixel. In this example, the pixel B has a lower luminance and/or chrominance than pixel A or pixel C. In a digitized image, the image may be examined on a pixel-by-pixel basis so that each pixel in the image can be compared to the adjacent pixels. When a pixel is detected having a lower intensity than both of its adjacent pixels, that pixel (i.e., the subject pixel) may be identified or classified as a candidate edge pixel.

A candidate edge pixel may be converted to a true edge pixel, in certain conditions. For example, if one or more candidate pixels are adjacent to one another, the combination of these pixels may indicate the presence of a true edge. Likewise, the detection of three, adjacent candidate edge pixels represent an even higher likelihood that the candidate edge pixels are actually true edge pixels. The number of contiguous candidate edge pixels required to classify the candidate edge pixels as true edge pixels depends on various factors such as compression/decoding quality and the tolerance of a particular application for fuzzy edges. True edges are generally determined by a two-dimensional examination of an image. That is, when a subject candidate edge pixel has been found, adjacent candidate edge pixels may be to the left or right or may be above or below the subject candidate edge pixel. Obviously, when two, adjacent candidate edge pixels have been found, a third candidate edge pixel may be found on any side of those pixels. In any event, it will be appreciated by those skilled in the art that a two-dimensional analysis should usually be applied to determine whether one or more candidate edge pixels reside on a true edge.

In an exemplary embodiment of the present invention, the intensity of the subject pixel can be modified to make an edge more distinctive. Enhanced intensity graph 652 illustrates the relative intensities of three pixels associated with a detected edge. The intensity of the subject pixel, pixel B, is significantly decreased such that the slope of the graph between pixel A and pixel B is significantly increased. Likewise, the slope of the graph between pixel B and pixel C also is increased. Comparing the intensity graph 650 to the enhanced intensity graph 652, it can be seen that the difference in intensity between pixels A and B and pixels C and B has been substantially increased. This increased difference will tend to create a more distinctive edge from a detected fuzzy edge.

In an exemplary embodiment of the present invention, an edge can be detected where the intensity of a subject pixel is less than the intensity of a left adjacent pixel and is less than the intensity of a right adjacent pixel. In an alternative embodiment, the subject pixel will only become classified as a candidate edge pixel if these requirements are met and if the difference between the intensity of the subject pixel and the intensity of the left adjacent pixel or the intensity of the right adjacent pixel is greater than a predetermined threshold. For example, if the pixel intensity difference is less than 20% of the full intensity range, the subject pixel may not be classified as a candidate edge pixel.

In an exemplary embodiment of the present invention, the subject pixel will not be enhanced, unless the subject pixel is classified as a candidate edge pixel and is classified as a true edge pixel. In an exemplary embodiment of the present invention, a true edge pixel is a candidate edge pixel that is immediately adjacent to at least two other candidate edge pixels. Those skilled in the art will appreciate that any number of required adjacent candidate edge pixels may be used within the scope of the present invention.

FIG. 7 is a flow chart depicting an exemplary method for examining and enhancing the pixels of a digitized image. The method begins with start block 700 and proceeds to step 702. At step 702, the first pixel is examined. The method then proceeds to decision block 704, wherein a determination is made as to whether the first pixel is a candidate edge pixel. If the first pixel is a candidate edge pixel, the method branches to decision block 706. If, on the other hand, the first pixel is not a candidate edge pixel, the method branches to decision block 710. At decision block 710, a determination is made as to whether the image includes any more unexamined pixels. If the image does not include any more unexamined pixels, the method branches to end block 714 and terminates. On the other hand, if the image includes more unexamined pixels, the method branches to step 712. At step 712, the next pixel is examined and the method proceeds back to decision block 704.

Returning now to decision block 704, if a determination is made that the examined pixel is a candidate edge pixel the method branches to decision block 706. At decision block 706, a determination is made as to whether the examined pixel is a true edge pixel. If the examined pixel is a true edge pixel, the method branches to step 708. As described above, in connection with FIG. 6, this step may be performed by examining adjacent and contiguous pixels in two-dimensions to determine whether a candidate edge pixel is a true edge pixel.

At step 708, the true edge pixel is enhanced thereby enhancing the edge. The method then proceeds from step 708 to decision block 710. Likewise, if at decision block 706, a determination is made that the candidate edge pixel is not a true edge pixel, the method branches to decision block 710. The method proceeds from decision block 710 as described above. The flow chart depicted in FIG. 7 is a broad overview of an exemplary embodiment of the present invention. The remaining figures are provided in connection with more specific description of the components of this broad overview.

Figure 8:
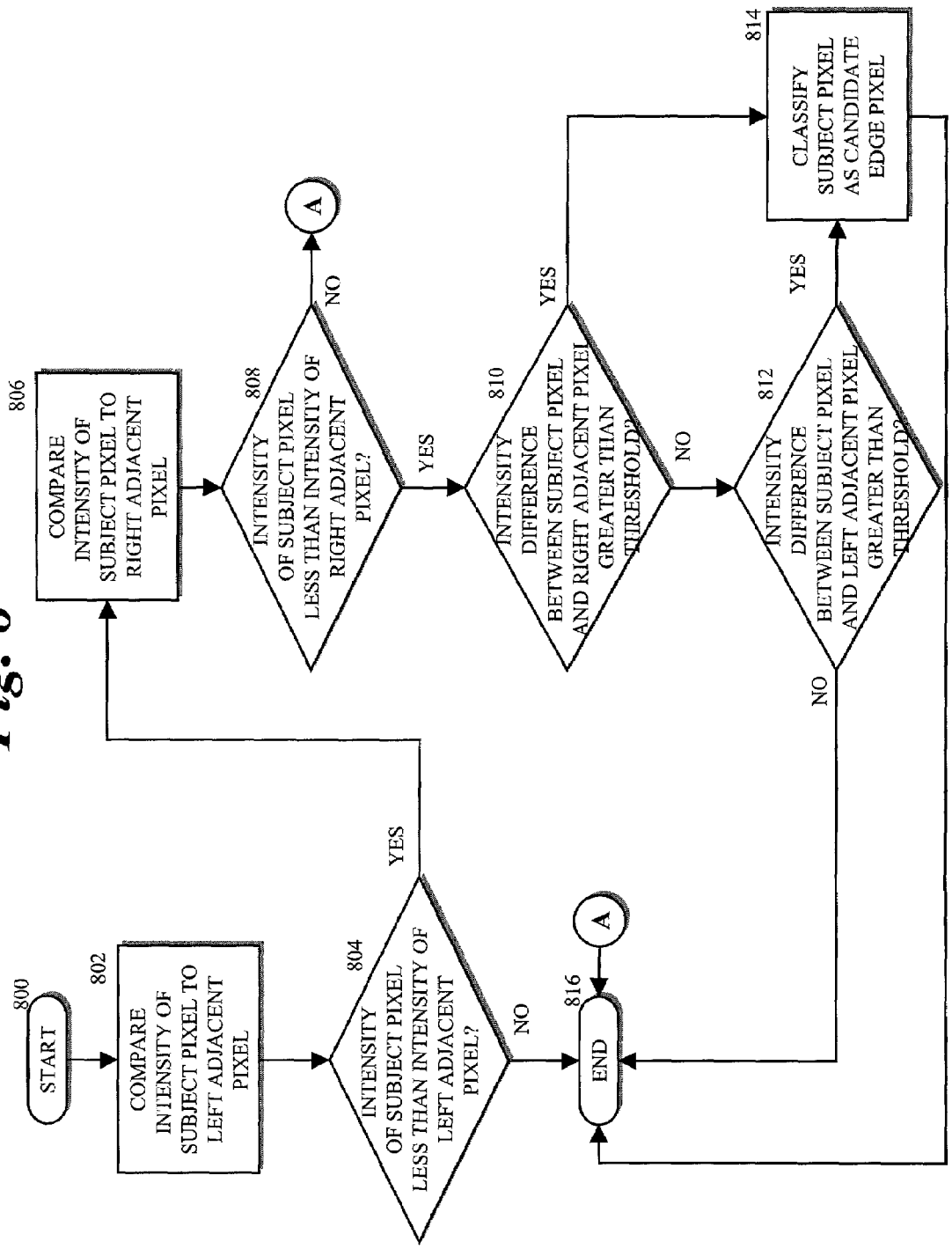
FIG. 8 is a flow chart depicting an exemplary method for detecting an edge in an image.

FIG. 8 is a flow chart depicting an exemplary method for detecting an edge in an image. The method of FIG. 8 begins at start block 800 and proceeds to step 802. At step 802, the intensity of a subject pixel is compared with the intensity of a left adjacent pixel. For the purposes of this description, it is assumed that the pixels of an image are examined on a pixel-by-pixel basis in a left-to-right fashion. Those skilled in the art will appreciate that this is an arbitrary choice and that the pixels of an image can be compared in a variety of methods, within the scope of the present invention.

The method proceeds from step 802 to decision block 804. At decision block 804, a determination is made as to whether the intensity of the subject pixel is less than the intensity of the left adjacent pixel. If the intensity of the subject pixel is not less than the intensity of the left adjacent pixel, the method branches to end block 816 and terminates. If, on the other hand, the intensity of the subject pixel is less than the intensity of the left adjacent pixel, the method branches to step 806.

At step 806, the intensity of the subject pixel is compared with the intensity of the right adjacent pixel. The method proceeds from step 806 to decision block 808. At decision block 808, a determination is made as to whether the intensity of the subject pixel is less than the intensity of the right adjacent pixel. If the intensity of the subject pixel is not less than the intensity of the right adjacent pixel, the method branches to end block 816 and terminates. If, on the other hand, the intensity of the subject pixel is less than the intensity of the right adjacent pixel, the method branches to decision block 810.

At decision block 810, a determination is made as to whether the intensity difference between the subject pixel and the right adjacent pixel is greater than a predetermined threshold. As described in connection with FIG. 6, the threshold may be determined based on various constraints including the acceptable tolerance for fuzzy edge in a particular application. If the intensity difference between the subject pixel and the right adjacent pixel is not greater than the predetermined threshold, the method branches to decision block 812. If, on the other hand, the intensity difference between the subject pixel and the right adjacent pixel is greater than the predetermined threshold, the method branches to step 814. At step 814, the subject pixel is classified as a candidate edge pixel. The method then proceeds to end block 816 and terminates.

At decision block 812, a determination is made as to whether the intensity difference between the subject pixel and the left adjacent pixel is greater than a predetermined threshold. If the intensity difference between the subject pixel and the left adjacent pixel is not greater than the predetermined threshold, the method branches to end block 816 and terminates. If, on the other hand, the intensity difference between the subject pixel and the left adjacent pixel is greater than the predetermined threshold, the method branches to step 814 and the subject pixel is classified as a candidate edge pixel. The method proceeds from step 814 to end block 816 and terminates.

Accordingly, the method of FIG. 8 detects an edge by comparing the intensity of a subject pixel with that of adjacent pixels. In cases where the subject pixel has a lower intensity than that of the adjacent pixels, the method determines whether the difference between the subject pixel and at least one of the adjacent pixels is greater than a predetermined threshold. Where this is the case, the subject pixel is classified as a candidate edge pixel.

FIG. 9 is a flow chart depicting an exemplary method for detecting and enhancing true edge pixels. The method of FIG. 9 begins with start block 900 and proceeds to decision block 902. At decision block 902, a determination is made as to whether a subject candidate edge pixel has an adjacent candidate edge pixel. If the subject candidate edge pixel does not have an adjacent candidate edge pixel, the method branches to end block 910 and terminates. If, on the other hand, a determination is made at decision block 902 that the subject candidate edge pixel has an adjacent candidate edge pixel, the method branches to decision block 904.

At decision block 904, a determination is made as to whether an adjacent candidate edge pixel has a second adjacent candidate edge pixel. If a determination is made that the adjacent candidate edge pixel does not have a second adjacent candidate edge pixel, the method branches to end block 910 and terminates. If, on the other hand, the adjacent candidate edge pixel is determined to have a second adjacent candidate edge pixel, the method proceeds to step 906. Notably, the subject candidate edge pixel need not be adjacent to the second adjacent candidate edge pixel. In an exemplary embodiment, however, the three pixels should be contiguous in one dimension or two dimensions.

At step 906, the subject pixel, the adjacent pixel, and the second adjacent pixel are classified as true edge pixels. This classification is appropriate where the method has identified three, contiguous candidate edge pixels. This indicates that the edge is a true edge, as opposed to an image flaw created by, for example, noise. The method proceeds from step 906 to step 908. At step 908, the intensity slope for the subject pixel, the adjacent pixel, and the second adjacent pixel is increased. This step is performed to enhance the pixels that have been classified as true edge pixels. Increasing the intensity slope causes the edge formed by the three pixels to be more distinctive, as described above in connection with FIG. 6. The method proceeds from step 908 to end block 910 and terminates.

FIG. 10 is a graph depicting an embodiment of the present invention in which the intensity slope adjustment is adapted to match the image quality of an unenhanced image. In this embodiment of the present invention, the modifications made to the intensity slope can be adapted to match the characteristics of a particular image. FIG. 10 shows a graph depicting the slope adjustment ($f(x)$) in relation to an image quality (x). The slope adjustment is depicted on the y-axis 1002 and the image quality is graphed along the x-axis 1004. The graph 1000 shows that the most aggressive slope adjustment is made when the image quality is average (i.e., between low quality and high quality), as identified by point 1010. However, when the image quality is low, the slope adjustment is also reduced, as identified by point 1006. Finally, when the image quality is high, the slope adjustment is also reduced, as identified by point 1008.

When the image quality is high, it is assumed that less edge enhancement (i.e., less slope adjustment) needs to be made to enhance the high quality image. Therefore, the identification and enhancement of a true edge is not needed as much as when processing an average quality image. On the other hand, a low quality image typically contains many image flaws. Often, these flaws will be falsely classified as a true edge and an unneeded edge enhancement will be performed on the flaw. Such errant edge enhancement will only serve to exaggerate the flaw. Accordingly, for low quality images, the slope adjustment is reduced to avoid counterproductive edge enhancement.

FIG. 11 is a graph depicting an adaptive slope adjustment utilized in another embodiment of the present invention. The graph 1100 depicts a relationship between the slope adjustment ($f(q)$) on the y-axis 1102 and the background intensity (q) on the x-axis 1104. The graph of FIG. 11 represents the philosophy that edge detection and enhancement is most suitable for pixels in dark or light backgrounds. More slope adjustment, therefore, is appropriate where an edge is detected in a portion of an image having a high background intensity, as identified by point 1108. Likewise, a higher slope adjustment is appropriate for an edge detected in a portion of an image having a low background intensity, as identified by point 1106. On the contrary, for an edge detected in a portion of an image having an average background intensity, the slope adjustment can be reduced, as identified by point 1110.

Figure 12A:
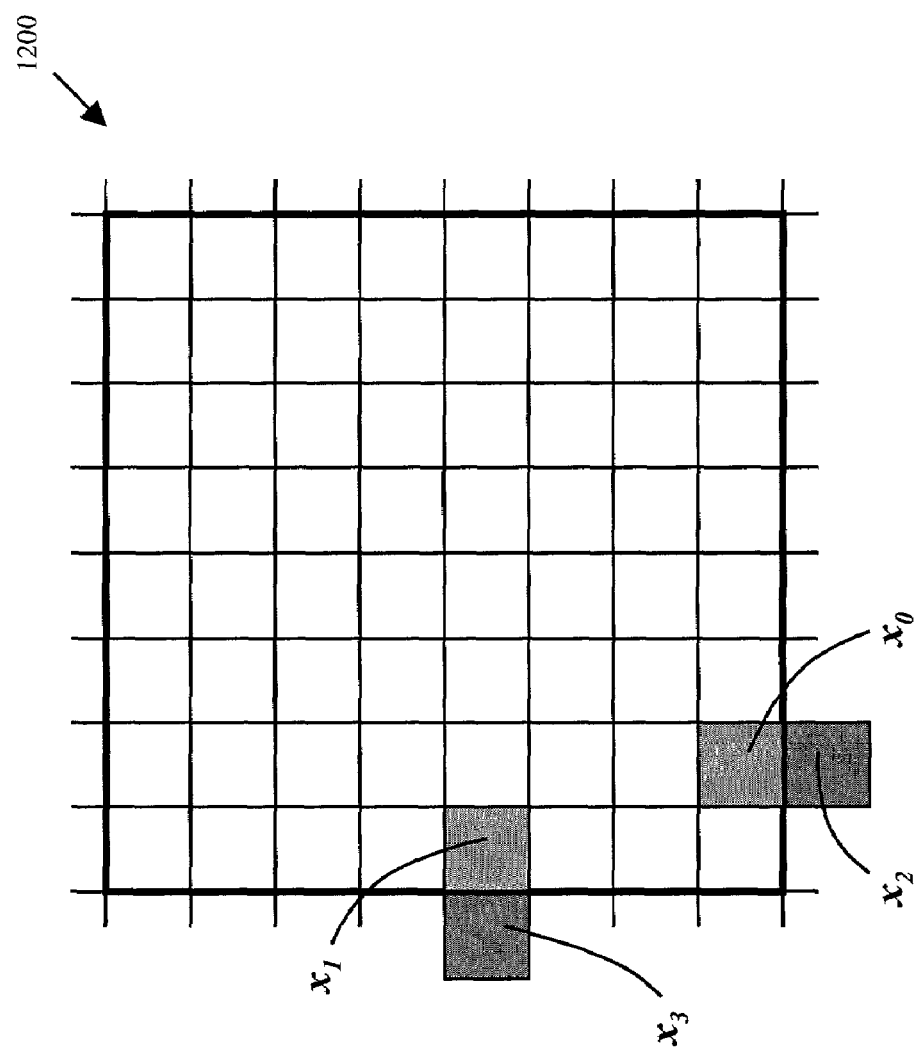
FIG. 12a is a block diagram depicting the presence of blockiness noise in an unenhanced image.

FIG. 12a is a block diagram depicting the presence of blockiness noise in an unenhanced picture. Blockiness noise can be created as a byproduct of the compression process. Most compression techniques divide a digitized image into blocks of pixels. It is typical that a compression technique will use 8-by-8-pixel blocks. Each block is compressed and decoded individually. As a result, it is common that pixels on the edges of each block no longer fit with the edge pixels of an adjacent pixel block. That is, because the edge pixels are individually processed, they may be decoded to look substantially different than an adjacent edge pixel that is part of another pixel block. Consequently, the edges of an image's pixel blocks may be perceivable. This phenomenon is well known and is called blockiness because the image appears to be formed of blocks rather than having a seamless appearance. Various filters have been devised to smooth blockiness. Many of these techniques can be used within the scope of the present invention to reduce blockiness. However, an exemplary embodiment of the present invention implements an adaptive method to refine the application of a blockiness filter.

Referring now to FIG. 12a, an 8-by-8-pixel block 1200 is depicted having edge pixels including pixels $x_0$ and $x_1$. Blocks $x_2$ and $x_3$ are edge pixels for adjacent pixel blocks (not shown entirely). Conventional blockiness filters can be used to smooth the differences between $x_0$ and $x_2$ and between $x_1$ and $x_3$. However, the mechanical application of a blockiness filter will simply cause, for example, $x_1$ to look more like $x_3$. This is usually acceptable, but in some instances, $x_1$ and $x_3$ are meant to be significantly different. In such instances, a conventional blockiness filter can be counter-productive.

Figure 12B:
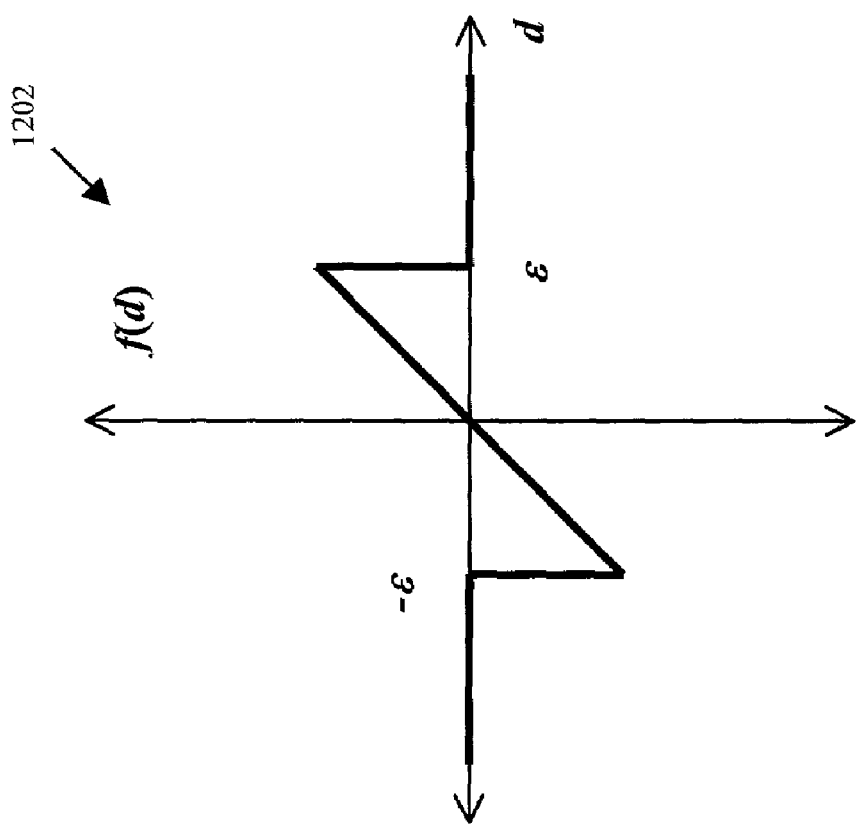
FIG. 12b is a graph depicting the adaptive performance of a blockiness filter that is an exemplary embodiment of the present invention.

In an exemplary embodiment of the present invention, the performance of a blockiness filter is adapted, based on the differences between adjacent edge pixels. Referring now to FIG. 12b, a graph 1202 depicts the amount of pixel modification $f(d)$ as a function of the differences (d) between the pixels. The difference between the pixels can be determined in a variety of ways. One way is to compare the image intensity of the pixels (e.g., luminance, chrominance). In an exemplary embodiment of the present invention, the difference (d) is determined by the formula:

$$d=(x_3-x_1)/4$$

where $x_1$ and $x_3$ are the image intensities of corresponding, adjacent edge pixels from adjacent pixel blocks. The image intensity that will be assigned to the pixel to smooth the edges is given by the formula:

$$x_1'=x_1+f(d)$$

where $x_1'$ is the image intensity of pixel $x_1$ following processing by the blockiness filter. However, in an exemplary embodiment of the present invention, a threshold value ($\epsilon$) is used to limit the application of the blockiness filter. Where the difference (d) is greater than the threshold value (or less than the negative threshold value), then the blockiness filter of an exemplary embodiment of the present invention does not smooth the subject pixel. This relationship is represented by the plot of the graph 1202 of FIG. 12.

When the difference between the compared pixels is dramatic, the blockiness filter will not affect those pixels. This improved blockiness filter may be implemented as part of a post-processing filter (e.g., element 508 of FIG. 5) or may be implemented as a separate filter. In any event, the blockiness filter can reduce the occurrence of undesirable smoothing of pixels. In particular, the adaptive blockiness filter of an exemplary embodiment of the present invention avoids smoothing edges in an image that may cause an edge enhancer (e.g., element 516 of FIG. 5) to fail to detect an edge in the image. Moreover, the adaptive blockiness filter of an exemplary embodiment of the present invention avoids smoothing an edge that will only be subsequently enhanced by an edge enhancer. Those skilled in the art will appreciate that although the operation of the blockiness filter is described in connection with the edge enhancer, the operation of these components may be kept separate and independent.

Figure 13:
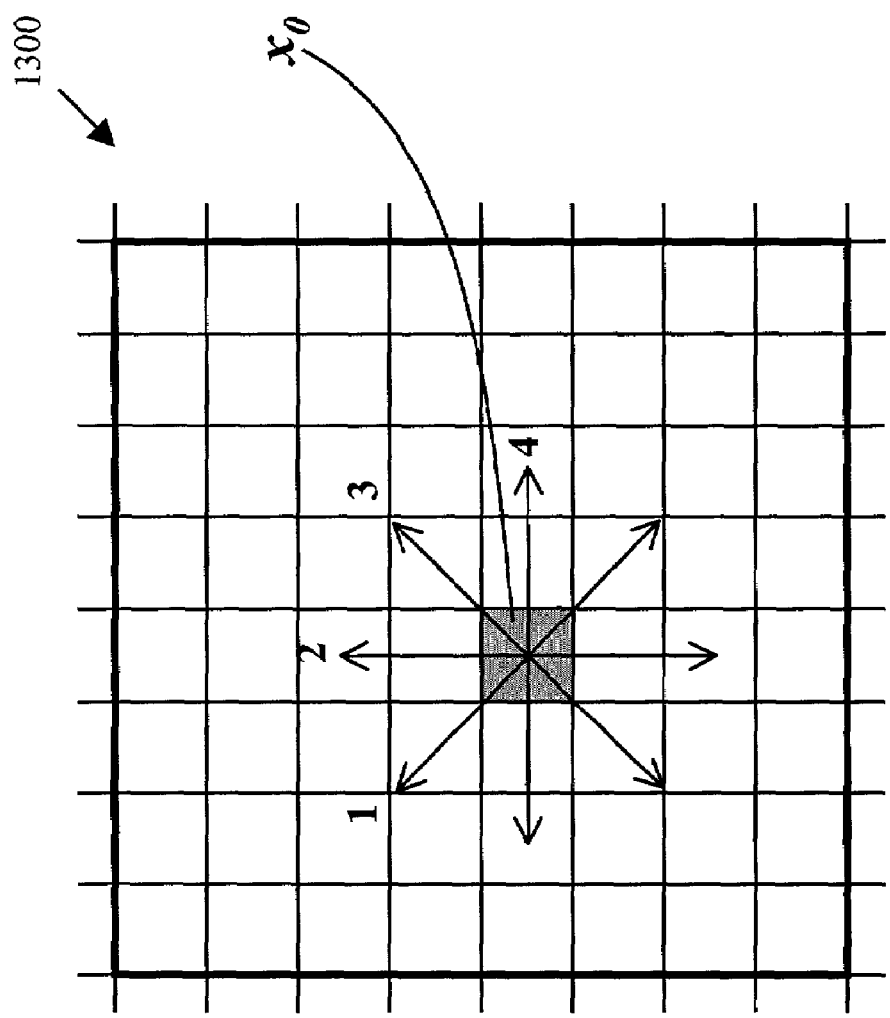
FIG. 13 is a block diagram depicting the adaptive performance of a salt-and-pepper noise filter that is an exemplary embodiment of the present invention.

FIG. 13 is a block diagram depicting the adaptive performance of a salt-and-pepper noise filter that is an exemplary embodiment of the present invention. Like blockiness, salt-and-pepper noise (SP noise) can be created as a byproduct of the compression process. SP noise is caused by image defects that are present in the frames of a video stream (or other image series). As the frames are displayed, the defects appear randomly on the screen. Various filters have been devised to eliminate SP noise. Many of these techniques can be used within the scope of the present invention to reduce or eliminate SP noise. However, an exemplary embodiment of the present invention refines the application of an SP noise filter.

Referring now to FIG. 13, a 3-by-3-pixel block 1300 is depicted having a center pixel, $x_0$. Pixel $x_0$ is the subject pixel, meaning that pixel $x_0$ is being considered for smoothing. Conventional SP noise filters can be used to smooth the differences between $x_0$ and one or more of the surrounding pixels. However, the mechanical application of an SP noise filter will simply cause $x_0$ to look more like one of the other pixels. This is often acceptable, but in some instances, this may be too aggressive an alteration of $x_0$. Moreover, if pixel $x_0$ is meant to be significantly different than the other pixel(s), then it may result in an overly aggressive smoothing of $x_0$. In such instances, a conventional SP noise filter can be counter-productive to the objective of post-processing. In one embodiment of the present invention, only edge pixels will be chosen for SP noise reduction/elimination.

In an exemplary embodiment of the present invention, the performance of an SP noise filter is adapted, based on the characteristics of the surrounding, adjacent pixels. Referring again to FIG. 13, the image intensity of the surrounding pixels (e.g., luminance, chrominance) can be used to determine an appropriate smoothing of pixel $x_0$. In an exemplary embodiment of the present invention, an image intensity median (z) can be determined among the subject pixel and each surrounding, adjacent pixel in each of the four directions identified in FIG. 13. Thus, z is determined by the formula:

$$z=\{\text{median value of pixels in direction } l\}$$

where l=1, 2, 3, and 4. The image intensity that will be assigned to the subject pixel is given by the formula:

$$x_0'=\text{Median}\{\max(z_l), \min(z_l), x_0\}$$

where $x_0'$ is the image intensity of pixel $x_0$ following processing by the SP noise filter. Accordingly, the adjusted image intensity, $x_0'$, is the median of the maximum intensity found, the minimum intensity found, and the subject pixel's original intensity, $x_0$. Thus, SP noise is reduced, but in a manner that is adaptive to the environment (i.e., background) in which the subject cell resides.

Figure 14A:
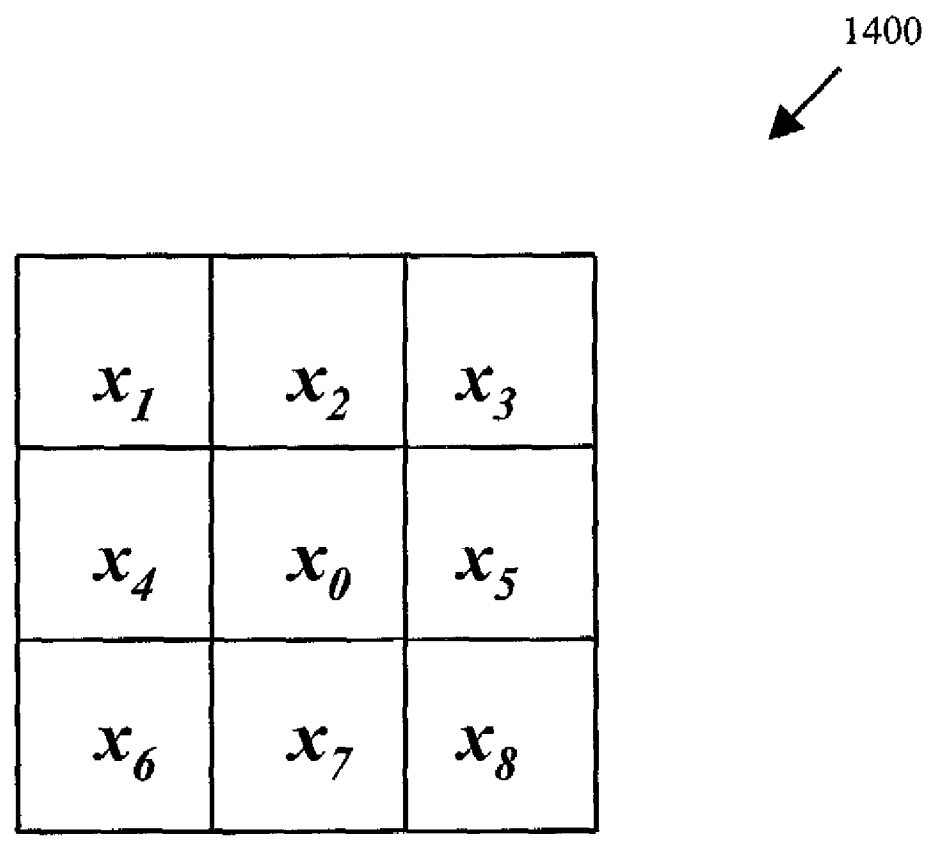

FIG. 14*a* is a block diagram depicting an exemplary group of adjacent pixels that may be examined and filtered for mosquito noise by an exemplary embodiment of the present invention. Like blockiness and salt-and-pepper noise (SP noise), mosquito noise can be created as a byproduct of the compression process. Mosquito noise is caused by image defects that are present in the frames of a video stream (or other image series). As the frames are displayed, the defects appear to flicker around the screen, thus giving the appearance of mosquitoes. Various filters have been devised to eliminate mosquito noise. Many of these techniques can be used within the scope of the present invention to reduce or eliminate mosquito noise. However, an exemplary embodiment of the present invention implements an adaptive method to refine the application of a mosquito noise filter.

Referring now to FIG. 14*a*, a 3-by-3 pixel block 1400 is depicted having nine pixels, $x_0$–$x_8$, eight of which surround pixel $x_0$. Pixel $x_0$ is the subject pixel, meaning that pixel $x_0$ is being considered for smoothing. Blocks $x_1$–$x_8$ are surrounding, adjacent pixels. Conventional mosquito noise filters can be used to smooth the differences between $x_0$ and one or more other pixels. However, the mechanical application of a mosquito noise filter will simply cause, for example, $x_0$ to look more like $x_3$. This is often acceptable, but in some instances, this may be too aggressive an alteration of $x_0$. Moreover, if $x_3$ is meant to be significantly different than $x_0$, then it may result in an overly aggressive smoothing of $x_0$. In such instances, a conventional mosquito noise filter can be counter-productive to the objective of post-processing.

Figure 14B:
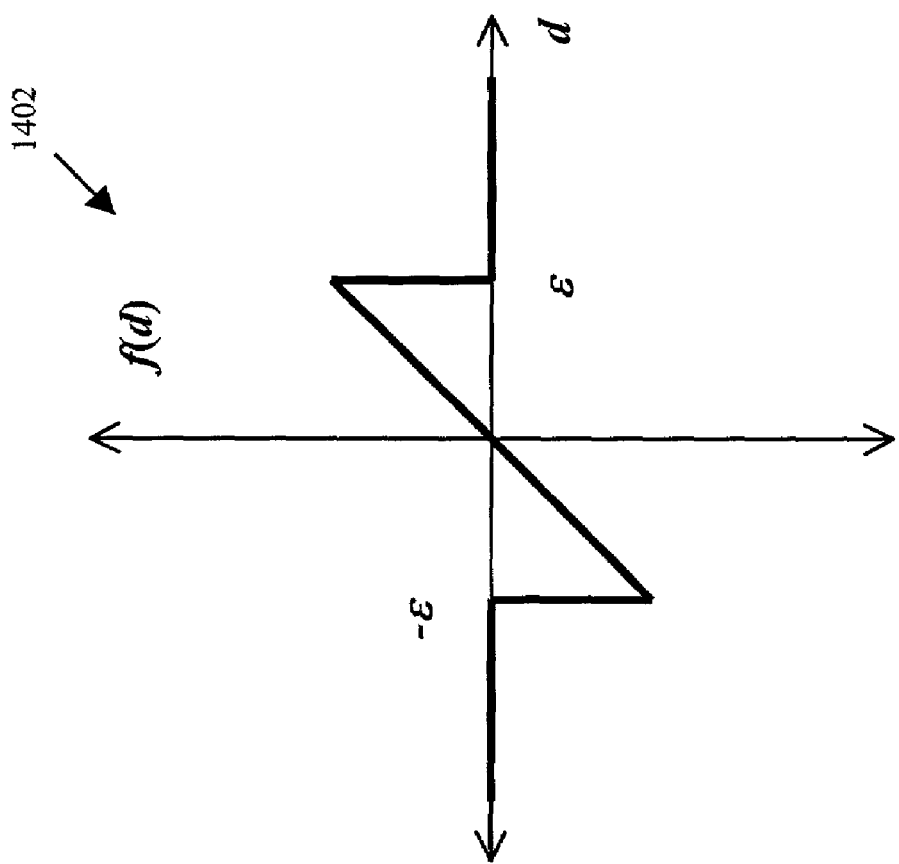
FIG. 14b is a graph depicting the adaptive performance of a mosquito noise filter that is an exemplary embodiment of the present invention.

In an exemplary embodiment of the present invention, the performance of a mosquito noise filter is adapted, based on the characteristics of the surrounding, adjacent pixels. Referring now to FIG. 14*b*, a graph 1402 depicts the amount of pixel modification $f(d)$ as a function of the differences (d) between the subject pixels and the surrounding, adjacent pixels. The difference between the pixels can be determined in a variety of ways. One way is to compare the image intensity of the pixels (e.g., luminance, chrominance). In an exemplary embodiment of the present invention, the difference (d) between the subject pixel and each surrounding, adjacent pixel is determined by the formula:

$$d=(x_0-x_i)$$

where $x_0$ and $x_i$ are the image intensities of the subject pixel and of an adjacent pixel, respectively. The image intensity that will be assigned to the pixel to smooth the edges is given by the formula:

$$x_0'=x_0-(f(d_1)+f(d_2)+f(d_3)+f(d_4)+f(d_5)+f(d_6)+f(d_7)+f(d_8))8$$

where $x_0'$ is the image intensity of pixel $x_0$ following processing by the mosquito noise filter. However, in an exemplary embodiment of the present invention, a threshold value ($\epsilon$) is used to limit the application of the mosquito noise filter. Where the difference (d) is greater than the threshold value (or less than the negative threshold value), then the mosquito noise filter of an exemplary embodiment of the present invention does not smooth the subject pixel. This relationship is represented by the plot of the graph 1402 of FIG. 14.

When the difference between the compared pixels is dramatic, the mosquito noise filter will not affect those pixels. This improved mosquito noise filter may be implemented as part of a post-processing filter (e.g., element 508 of FIG. 5) or may be implemented as a separate filter. In any event, the mosquito noise filter can reduce the occurrence of undesirable smoothing of pixels. In particular, the adaptive mosquito noise filter of an exemplary embodiment of the present invention avoids smoothing edges in an image that may cause an edge enhancer (e.g., element 516 of FIG. 5) to fail to detect an edge in the image. Those skilled in the art will appreciate that although the operation of the blockiness filter is described in connection with the edge enhancer, the operation of these components may be kept separate and independent.

Although the present invention has been described in connection with various exemplary embodiments, those of ordinary skill in the art will understand that many modifications can be made thereto within the scope of the claims that follow. For example, the inventors contemplate that the various embodiments of the present invention could be utilized in a wide variety of applications, including, but not limited to, images used in animation, computerized banners, real-time streaming video, stored video, and gaming graphics. Accordingly, it is not intended that the scope of the invention in any way be limited by the above description, but instead be determined entirely by reference to the claims that follow.

What is claimed is:

1. A method for processing an image, comprising the steps of:
   comparing a first image intensity associated with a subject image portion with a second image intensity associated with an adjacent image portion;
   determining an image intensity difference between the first image intensity and the second image intensity;
   classifying the subject image portion as a candidate edge portion in response to a determination that the first image intensity is less than the second image intensity and a determination that the image intensity difference is greater than a predetermined threshold image intensity difference;
   determining whether the adjacent image portion is a non-edge portion;
   determining whether the candidate edge portion is a true edge portion the true edge portion having an intensity slope; and,
   enhancing the true edge portion by increasing the difference between the true edge portion and the non-edge portion by increasing the intensity slope for the true edge, wherein the third image intensity is less than the first image intensity, thereby sharpening the true edge portion.

2. The method of claim 1, wherein the step of determining whether the candidate edge portion is a true edge portion, comprises the step of determining whether the candidate edge portion is adjacent to at least one second candidate edge portion.

3. The method of claim 2, wherein the step of determining whether the candidate edge portion is a true edge portion, further comprises the step of determining whether the candidate edge portion is adjacent to the second candidate edge portion and to a third candidate edge portion.

4. The method of claim 3, wherein the candidate edge portion, the second candidate edge portion and the third candidate edge portion form a line.

5. The method of claim 1, wherein the image is a digitized image.

6. The method of claim 5, wherein the subject image portion is a pixel.

7. The method of claim 5, wherein the adjacent image portion is a pixel.

8. The method of claim 5, wherein the image is a frame of a video stream.

9. The method of claim 8, wherein the image intensity is measured in luminance.

10. The method of claim 8, wherein the image intensity is measured in luminance and chrominance.

11. The method of claim 1, wherein the image is an image-type selected from the group consisting of:
    animation;
    computerized banners;
    real-time streaming video;
    stored video; and
    gaming graphics.

12. A system for enhancing a digitized image, comprising:
    a decoder configured to receive an encoded digitized image and to expand the encoded digitized image to generate a decoded digitized image;
    a post-processing unit configured to generate a processed image by filtering the decoded digitized image; and
    an edge enhancer configured to detect a candidate edge and a non-edge in the processed image, determine if the candidate edge is a true edge or a non-edge, the true edge portion having an intensity slope, and to sharpen the true edge in the processed image by increasing the intensity slope for the true edge wherein the difference between the true edge and the non-edge is increased, thereby sharpening the true edge.

13. The system of claim 12, wherein the edge is a portion of the decoded digitized image separating a first image portion of substantially uniform image intensity from a second image portion of substantially uniform image intensity.

14. The system of claim 12, wherein the edge is a line in the decoded digitized image.

15. The system of claim 12, wherein the edge enhancer is further configured to detect the edge by comparing a subject portion of the decoded digitized image with a first adjacent portion of the decoded digitized image and with a second portion of the decoded digitized image and determining that the subject portion is associated with a lower image intensity level than a first image intensity associated with the first adjacent portion of the decoded digitized image and a second image intensity associated with the second adjacent portion of the decoded digitized image.

16. The system of claim 12, wherein the post-processor removes an image flaw from the decoded digitized image, in response to a determination that an image intensity of a pixel associated with the image flaw does not differ from at least one surrounding pixel by more than a threshold value.

17. The system of claim 12, wherein the post-processor adjusts the image flaw in the decoded digitized image, by modifying an image intensity of a pixel associated with the image flaw to correspond to a median image intensity value of at least one surrounding pixel.

18. A method for detecting and enhancing an edge in a decoded digitized image, comprising the steps of:
  determining a first image intensity associated with a first pixel in the decoded digitized image;
  determining a second image intensity associated with a second pixel in the decoded digitized image;
  determining a third image intensity associated with a third pixel in the decoded digitized image;
  classifying the first pixel as a first candidate edge pixel in response to a determination that the first image intensity is less than the second image intensity and is less than the third image intensity;
  determining whether the first pixel is adjacent to a second candidate edge pixel;
  determining whether the second pixel is adjacent to a third candidate edge pixel;
  classifying a fourth pixel as a non-edge edge pixel;
  classifying the first pixel as a true edge pixel, the true pixel having an intensity slope, in response to a determination that the first pixel is adjacent to the second candidate edge pixel and the second candidate edge pixel is adjacent to the third candidate edge pixel; and
  enhancing the true edge pixel by increasing the intensity slope for the true edge wherein the difference between the true edge pixel and the non-edge pixel is increased, thereby sharpening the true edge pixel.

19. The method of claim 18, further comprising the steps of:
  associating a fifth image intensity with the second pixel, the fifth image intensity being higher than the second image intensity; and
  associating a sixth image intensity with the third pixel, the sixth image intensity being higher than the third image intensity.

20. The method of claim 18, further comprising the steps of:
  determining a background color associated with the first pixel;
  determining a quality level of the digitized image; and
  selecting the fourth image intensity based on the background color and the quality level.

21. A method for enhancing a digitized image, comprising the steps of: receiving an encoded digitized image;
  expanding the encoded digitized image to generate a decoded digitized image;
  generating a processed image by filtering the decoded digitized image; and
  detecting a non-edge in the processed image;
  detecting a candidate edge in the processed image;
  determining if the candidate edge is a true edge or a non-edge, wherein the true edge has an intensity slope;
  enhancing the true edge in the processed image by increasing the intensity slope for the true edge wherein the difference between the true edge and the non-edge is increased, thereby sharpening the true edge.

22. The method of claim 21, wherein the edge is a portion of the decoded digitized image separating a first image portion of substantially uniform image intensity from a second image portion of substantially uniform image intensity.

23. The method of claim 21, wherein the edge is a line in the decoded digitized image.

24. The method of claim 21, wherein the step of detecting an edge further comprises comparing a subject portion of the decoded digitized image with a first adjacent portion of the decoded digitized image and with a second portion of the decoded digitized image and determining that the subject portion is associated with a lower image intensity level than a first image intensity associated with the first adjacent portion of the decoded digitized image and a second image intensity associated with the second adjacent portion of the decoded digitized image.

25. The method of claim 21, further comprising removing an image flaw from the decoded digitized image, in response to a determination that an image intensity of a pixel associated with the image flaw does not differ from at least one surrounding pixel by more than a threshold value.

26. The method of claim 21, further comprising adjusting an image flaw in the decoded digitized image, by modifying an image intensity of a pixel associated with the image flaw to correspond to a median image intensity value of at least one surrounding pixel.

* * * * *